US012668322B2

(12) United States Patent
Hatano et al.

(10) Patent No.: US 12,668,322 B2
(45) Date of Patent: Jun. 30, 2026

(54) CONTROL DEVICE, MOBILE OBJECT, MOBILE OBJECT CONTROL SYSTEM, CONTROL METHOD, AND TRAILER

(71) Applicant: TOYOTA JIDOSHA KABUSHIKI KAISHA, Toyota (JP)

(72) Inventors: Yasuyoshi Hatano, Nisshin (JP); Daiki Yokoyama, Miyoshi (JP); Jyunya Katou, Toyota (JP); Shogo Yasuyama, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 18/778,366

(22) Filed: Jul. 19, 2024

(65) Prior Publication Data

US 2025/0091671 A1 Mar. 20, 2025

(30) Foreign Application Priority Data

Sep. 15, 2023 (JP) ................................. 2023-150098

(51) Int. Cl.
B62D 65/18 (2006.01)
B60W 40/13 (2012.01)
(Continued)

(52) U.S. Cl.
CPC ............. B62D 65/18 (2013.01); B60W 40/13 (2013.01); G05D 1/22 (2024.01); G06Q 50/04 (2013.01); B60W 2720/10 (2013.01)

(58) Field of Classification Search
None
See application file for complete search history.

(56) References Cited

U.S. PATENT DOCUMENTS

| | | | | |
|---|---|---|---|---|
| 9,586,297 B2 * | 3/2017 | Kozasa | ................. | B65G 37/00 |
| 2011/0099788 A1 * | 5/2011 | Kilibarda | ................. | B66F 7/14 |
| | | | | 29/244 |

(Continued)

FOREIGN PATENT DOCUMENTS

| | | | | | |
|---|---|---|---|---|---|
| CN | 116339339 A | * | 6/2023 | ............. | G05D 1/024 |
| JP | 2017-538619 A | | 12/2017 | | |

(Continued)

OTHER PUBLICATIONS

Wittig Henning et al: "Aeroflex smart power dolly: Towards efficient and missionoriented longhaul vehicles", Proceedings of 8th Transport Research Arena TRA 2020, Apr. 27-30, 2020, Helsinki, Finland, Apr. 30, 2020 (Apr. 30, 2020), pp. 1-10.

(Continued)

*Primary Examiner* — Amelia Vorce
(74) *Attorney, Agent, or Firm* — Oliff PLC

(57) ABSTRACT

A control device is configured to control movement of a mobile object that can travel by driverless driving and that is transported in a process of manufacturing the mobile object. The control device includes a control command section configured to generate and output a control command to cause the mobile object to move. The control command section is configured to generate the control command by using vehicle state information that is information related to at least one of: magnitude of impact force applied to the mobile object; a direction in which the impact force acts; weight of the mobile object; weight of a trailer configured to carry a part and configured to be removably coupled to the mobile object and move, the part being configured to be attached to the mobile object; and a process in which the mobile object is positioned.

19 Claims, 14 Drawing Sheets

(51) Int. Cl.
  *G05D 1/22*        (2024.01)
  *G06Q 50/04*      (2012.01)

(56)                References Cited

U.S. PATENT DOCUMENTS

| | | | |
|---|---|---|---|
| 2015/0137482 A1 | 5/2015 | Woolf et al. | |
| 2016/0214668 A1* | 7/2016 | Ogawa .................. | B62D 65/18 |
| 2016/0355223 A1* | 12/2016 | Kozasa ................. | B62D 65/18 |
| 2017/0308084 A1* | 10/2017 | Spicer .................. | B62B 5/0083 |
| 2017/0320529 A1 | 11/2017 | Nordbruch | |
| 2021/0394780 A1* | 12/2021 | Thomas ................ | B62D 21/02 |
| 2021/0397178 A1 | 12/2021 | Thomas et al. | |
| 2022/0009712 A1* | 1/2022 | Kilibarda ........... | G05B 19/4105 |
| 2022/0089237 A1* | 3/2022 | Sverdlov ............... | B25J 9/1697 |

FOREIGN PATENT DOCUMENTS

| | | | |
|---|---|---|---|
| JP | 2021-062790 A | 4/2021 | |
| KR | 101300476 B1 * | 9/2013 | ............. B23P 19/06 |
| WO | WO-2015030058 A1 * | 3/2015 | ............. B62D 65/18 |

OTHER PUBLICATIONS

Peters Diane L. et al: "Design and Development of a Semi-Autonomous Trailer Concept", SAE International Journal of Connected and Automated Vehicles, vol. 2, No. 2, Jan. 23, 2019 (Jan. 23, 2019), pp. 79-85.

* cited by examiner

FIG. 5

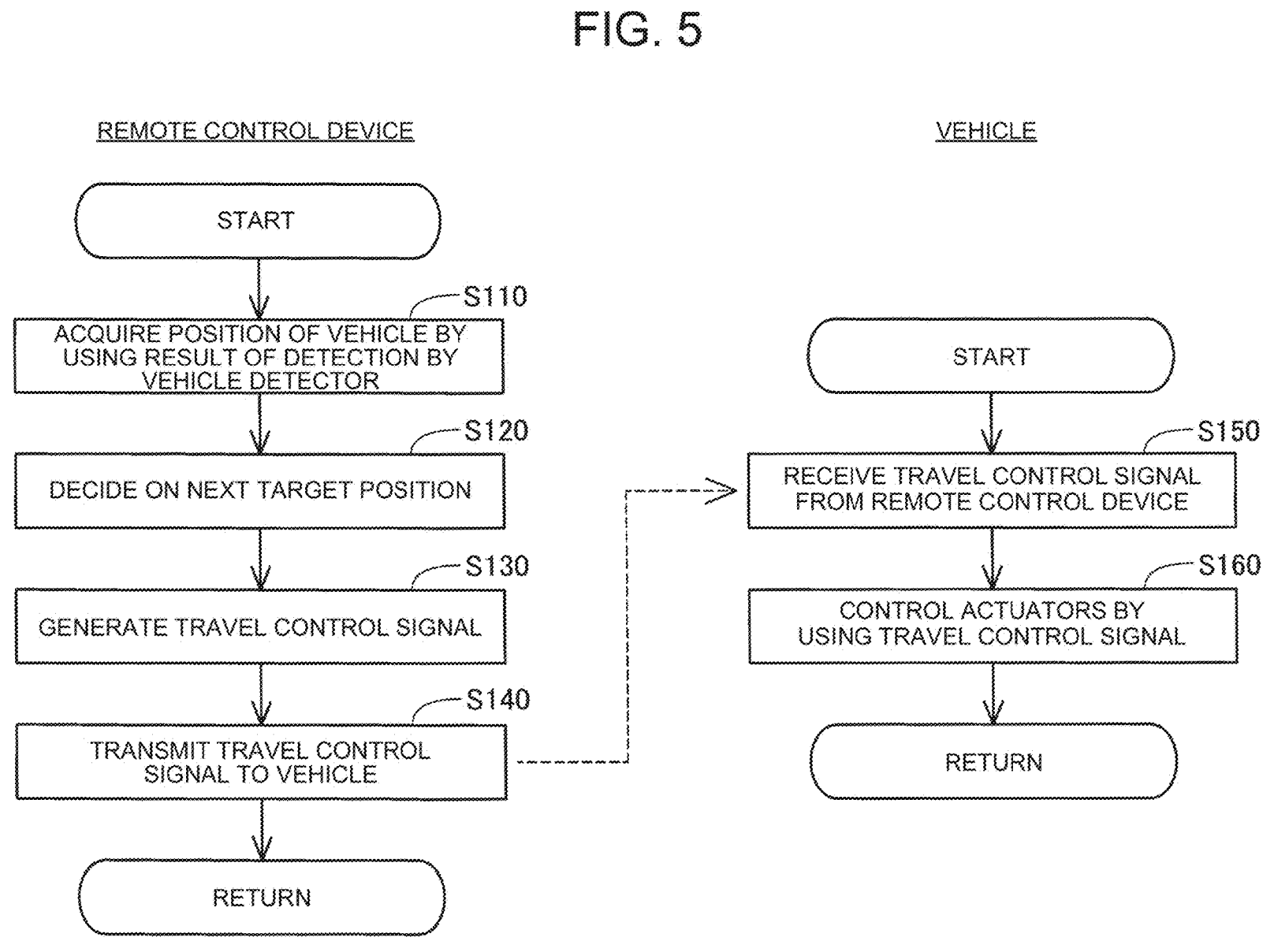

VEHICLE

START

RECEIVE TRAVEL CONTROL SIGNAL
FROM REMOTE CONTROL DEVICE — S150

CONTROL ACTUATORS BY
USING TRAVEL CONTROL SIGNAL — S160

RETURN

REMOTE CONTROL DEVICE

START

ACQUIRE POSITION OF VEHICLE BY
USING RESULT OF DETECTION BY
VEHICLE DETECTOR — S110

DECIDE ON NEXT TARGET POSITION — S120

GENERATE TRAVEL CONTROL SIGNAL — S130

TRANSMIT TRAVEL CONTROL
SIGNAL TO VEHICLE — S140

RETURN

FIG. 9

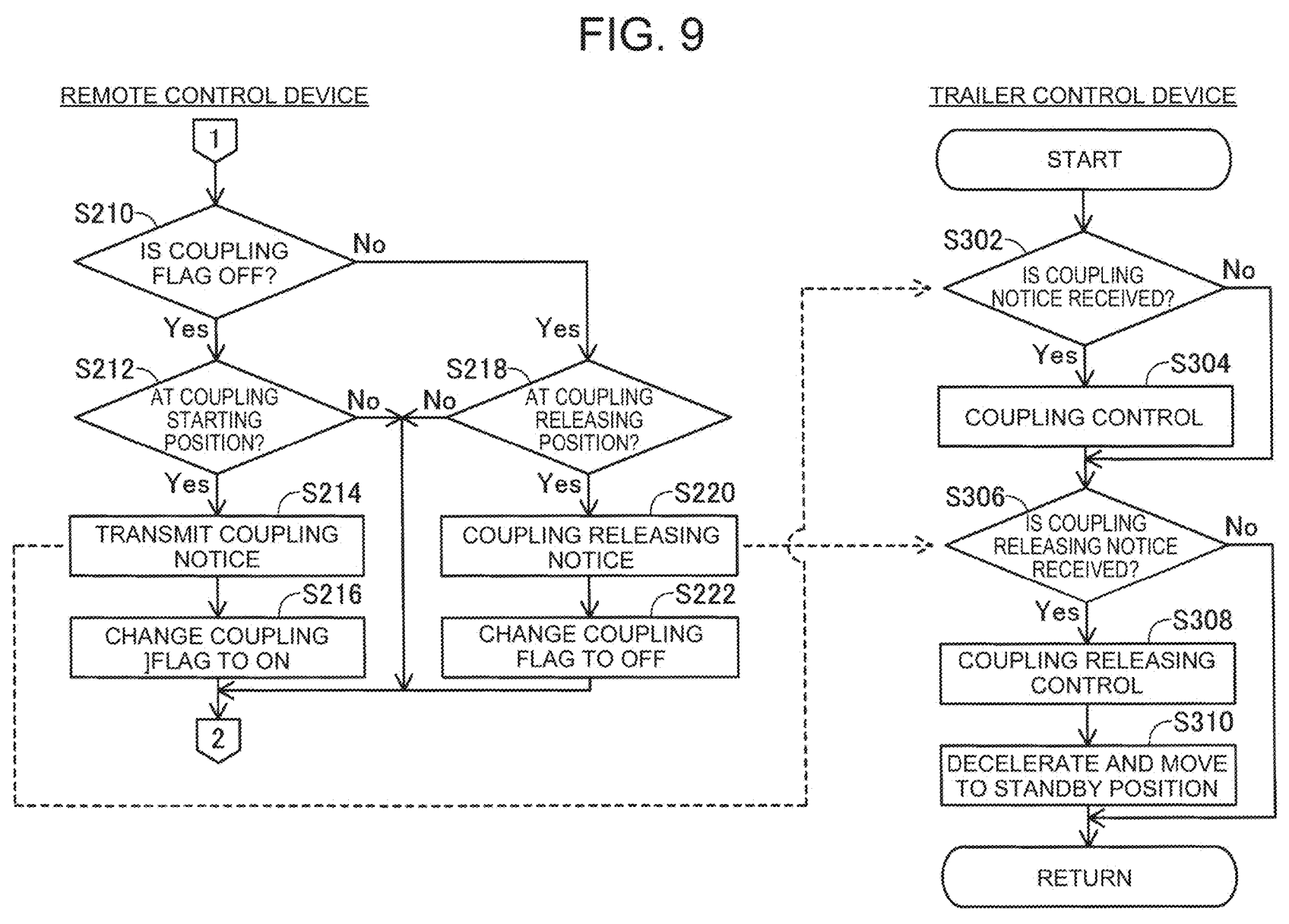

TRAILER CONTROL DEVICE

START

S302 — IS COUPLING NOTICE RECEIVED?
No
Yes

S304 — COUPLING CONTROL

S306 — IS COUPLING RELEASING NOTICE RECEIVED?
No
Yes

S308 — COUPLING RELEASING CONTROL

S310 — DECELERATE AND MOVE TO STANDBY POSITION

RETURN

REMOTE CONTROL DEVICE

1

S210 — IS COUPLING FLAG OFF?
No
Yes

S212 — AT COUPLING STARTING POSITION?
No
Yes

S214 — TRANSMIT COUPLING NOTICE

S216 — CHANGE COUPLING FLAG TO ON

2

S218 — AT COUPLING RELEASING POSITION?
Yes
No

S220 — COUPLING RELEASING NOTICE

S222 — CHANGE COUPLING FLAG TO OFF

FIG. 10

VEHICLE

START

ACQUIRE POSITION INFORMATION ON
VEHICLE BY USING RESULT OF
DETECTION BY VEHICLE DETECTOR — S510

DECIDE ON NEXT TARGET POSITION — S520

GENERATE TRAVEL CONTROL SIGNAL — S530

CONTROL ACTUATORS BY
USING TRAVEL CONTROL SIGNAL — S540

RETURN

CONTROL DEVICE, MOBILE OBJECT, MOBILE OBJECT CONTROL SYSTEM, CONTROL METHOD, AND TRAILER

CROSS-REFERENCE TO RELATED APPLICATION

This application claims priority to Japanese Patent Application No. 2023-150098 filed on Sep. 15, 2023, incorporated herein by reference in its entirety.

BACKGROUND

1. Technical Field

The present disclosure relates to a control device, a database, a server device, a mobile object, a mobile object control system, a control method, a trailer, and a trailer control system.

2. Description of Related Art

There has been known a technology of driverlessly driving a vehicle by remote control in the process of manufacturing the vehicle (for example, Japanese Unexamined Patent Application Publication (Translation of PCT application) No. 2017-538619).

SUMMARY

With regard to a vehicle in the course of manufacture, a problem is that a deviation can occur in control of movement of the vehicle by driverless driving, due to external force applied in a process of attaching a part, and a change in weight as a result of the part being attached. Such a problem is not only for vehicles but is common in arbitrary mobile objects.

The present disclosure can be implemented in embodiments as follows.

Embodiment 1: According to one embodiment of the present disclosure, a control device configured to control movement of a mobile object that is configured to travel by driverless driving and that is transported in a manufacture process of manufacturing the mobile object is provided. The control device includes a control command section configured to generate and output a control command to cause the mobile object to move. The control command section is configured to generate the control command by using vehicle state information that is information related to at least one of: magnitude of impact force applied to the mobile object; a direction in which the impact force acts; weight of the mobile object; weight of a trailer configured to carry a part and configured to be removably coupled to the mobile object and move, the part being configured to be attached to the mobile object; and a process in which the mobile object is positioned.

The control device in embodiment 1 includes the control command section that generates and outputs a control command to cause the mobile object to move. The control command section generates the control command by using the vehicle state information. Accordingly, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 2: In the embodiment, the control command section may be configured to generate the control command by using the vehicle state information in such a manner as to restrain a change in speed of the mobile object that changes due to at least one of the impact force, attachment of the part to the mobile object, coupling of the trailer to the mobile object, and release of the coupling between the trailer and the mobile object.

The control device in embodiment 2 generates the control command by using the vehicle state information in such a manner as to restrain a change in speed of the mobile object that changes due to at least one of the impact force, attachment of the part to the mobile object, coupling of the trailer to the mobile object, and release of the coupling between the trailer and the mobile object. Accordingly, it is possible to restrain a change in speed of the mobile object that changes due to at least one of the impact force, attachment of the part to the mobile object, coupling of the trailer to the mobile object, and release of the coupling between the trailer and the mobile object.

Embodiment 3: In the embodiment, the control command section may be configured to generate the control command by using the vehicle state information in such a manner as to restrain a change in traveling direction of the mobile object that changes due to at least one of the impact force, attachment of the part to the mobile object, coupling of the trailer to the mobile object, and release of the coupling between the trailer and the mobile object.

The control device in embodiment 3 generates the control command by using the vehicle state information in such a manner as to restrain a change in traveling direction of the mobile object that changes due to at least one of the impact force, attachment of the part to the mobile object, coupling of the trailer to the mobile object, and release of the coupling between the trailer and the mobile object. Accordingly, it is possible to restrain a change in traveling direction of the mobile object that changes due to at least one of the impact force, attachment of the part to the mobile object, coupling of the trailer to the mobile object, and release of the coupling between the trailer and the mobile object.

Embodiment 4: In the embodiment, occurrence of the impact force may stem from at least one of force acting when the part comes into contact with the mobile object, force acting when the part is fixed to the mobile object, and force acting when the trailer is coupled to the mobile object.

In the control device in embodiment 4, occurrence of the impact force stems from at least one of force acting when the part comes into contact with the mobile object, force acting when the part is fixed to the mobile object, and force acting when the trailer is coupled to the mobile object. Accordingly, it is possible to restrain a deviation, in control of the movement of the mobile object by driverless driving, that can be caused by the impact force, occurrence of which stems from force acting when the part comes into contact with the mobile object, force acting when the part is fixed to the mobile object, and force acting when the trailer is coupled to the mobile object.

Embodiment 5: In the embodiment, the control device may further include an information acquisition section configured to acquire, as the vehicle state information, impact force information related to the impact force from a sensor configured to detect the impact force. The control command section may be configured to generate the control command by using the acquired impact force information.

The control device in embodiment 5 is configured to acquire the impact force information related to the impact force from the sensor configured to detect the impact force, and is configured to generate the control command by using the acquired impact force information. Accordingly, the control command can be generated by using the impact force actually applied to the mobile object. According to the embodiment, it is possible to restrain a deviation, in control of the movement of the mobile object by driverless driving, that can be caused by the impact force, compared to an embodiment in which a control command is generated that is set by estimating an applied impact force beforehand.

Embodiment 6: In the embodiment, the control device may further include an information acquisition section configured to acquire, as the vehicle state information, coupling release information indicating whether or not a coupled state in which the trailer and the mobile object are coupled together is released, from a sensor configured to acquire the coupling release information. The control command section may be configured to generate the control command by using the coupling release information.

The control device in embodiment 6 is configured to acquire the coupling release information, which indicates whether or not the coupled state in which the trailer and the mobile object are coupled together is released, from the sensor that acquires the coupling release information, and is configured to generate the control command by using the coupling release information. Accordingly, the control command can be generated based on the actual coupled state, and it is thus possible to restrain a deviation, in control of the movement of the mobile object by driverless driving, that is caused by the coupled state with the trailer.

Embodiment 7: In the embodiment, the control device may further include an information acquisition section configured to acquire, as the vehicle state information, weight-related information that is information related to the weight of the mobile object. The control command section may be configured to use the acquired weight-related information and, when the weight of the mobile object increases, generate the control command in such a manner as to decrease speed of the mobile object, compared to a speed before the weight of the mobile object increases.

The control device in embodiment 7 uses the acquired weight-related information and, when the weight of the mobile object increases, generates the control command in such a manner as to decrease the speed of the mobile object, compared to that before the weight of the mobile object increases. Accordingly, even if the weight of the mobile object increases, it is possible to restrain the braking distance of the mobile object from increasing.

Embodiment 8: In the embodiment, the control device may further include a weight estimation section configured to estimate a weight of the mobile object by using the weight-related information. The control command section may be configured to use the estimated weight of the mobile object and, when the weight of the mobile object increases, generate the control command in such a manner as to decrease the speed of the mobile object, compared to the speed before the weight of the mobile object increases.

The control device in embodiment 8 further includes the weight estimation section that estimates a weight of the mobile object by using the weight-related information. The control command section uses the estimated weight of the mobile object and, when the weight of the mobile object increases, generates the control command in such a manner as to decrease the speed of the mobile object, compared to that before the weight of the mobile object increases. Accordingly, with the estimated weight of the mobile object, such a control command at to decrease the speed of the mobile object can also be generated.

Embodiment 9: In the embodiment, the control device may further include an information keeping section configured to keep position-weight correspondence information that is information in which a position of the mobile object and a weight of the mobile object are associated with each other. The information acquisition section may be configured to acquire a position of the mobile object as the weight-related information. The weight estimation section may be configured to estimate a weight of the mobile object at the position of the mobile object, by using the position-weight correspondence information and the acquired position of the mobile object.

The control device in embodiment 9 further includes the information keeping section that keeps the position-weight correspondence information. The information acquisition section acquires the position of the mobile object as the weight-related information, and the weight estimation section estimates a weight of the mobile object at the position of the mobile object, by using the position-weight correspondence information and the acquired position of the mobile object. In such a manner, the information acquisition section can easily estimate a weight of the mobile object by using the position of the mobile object. Note that the term "position of the mobile object" is not limited to coordinates indicating the position of the mobile object, and has a broader meaning that also indicates a process in which the mobile object is positioned.

Embodiment 10: In the embodiment, the information acquisition section may be configured to acquire, as the weight-related information, displacement information indicating a displacement of a suspension device that supports a wheel included in the mobile object. The weight estimation section may be configured to estimate a weight of the mobile object by using the displacement information.

In the control device in embodiment 10, the information acquisition section acquires the displacement information, which indicates a displacement of the suspension device, as the weight-related information. Since the weight estimation section estimates a weight of the mobile object by using the displacement information, it is possible to estimate a weight of the mobile object with more accuracy, based on the displacement information that changes according to the actual weight of the mobile object.

Embodiment 11: In the embodiment, the control command section may be configured to generate the control command in such a manner as to decrease the speed of the mobile object, compared to the speed before the weight of the mobile object increases, when the mobile object is positioned in a prior-to-bumper-attachment process, which is a process prior to a bumper attachment process in which a bumper is attached to the mobile object in the manufacture process, and when the weight of the mobile object increases compared to the weight of the mobile object in a process prior to the prior-to-bumper-attachment process. The control command section may be configured not to generate such a control command as to decrease the speed of the mobile object, compared to the speed before the weight of the mobile object increases, when the mobile object is positioned in a subsequent-to-bumper-attachment process, which is a process subsequent to the bumper attachment process, and when the weight of the mobile object increases compared to the weight of the mobile object in a process prior to the subsequent-to-bumper-attachment process.

Since the control device in embodiment 11 does not generate such a control command as to decrease the speed of the mobile object, compared to that before the weight of the mobile object increases, when the mobile object is positioned in the subsequent-to-bumper-attachment process, which is a process subsequent to the bumper attachment process, and when the weight of the mobile object increases compared to the weight of the mobile object in a process prior to the subsequent-to-bumper-attachment process, it is possible to restrain time required to transport the mobile object from increasing.

Embodiment 12: In the embodiment, the control command section may be configured to generate the control command in such a manner as to decrease the speed of the mobile object, compared to the speed before the weight of the mobile object increases, when the mobile object is positioned in a manned process in which a worker is present in the manufacture process and when the weight of the mobile object increases compared to the weight of the mobile object in a process prior to the manned process. The control command section may be configured not to generate such a control command as to decrease the speed of the mobile object, compared to the speed before the weight of the mobile object increases, when the mobile object is positioned in an unmanned process in which a worker is not present in the manufacture process and when the weight of the mobile object increases compared to the weight of the mobile object in a process prior to the unmanned process.

Since the control device in embodiment 12 does not generate such a control command as to decrease the speed of the mobile object, compared to that before the weight of the mobile object increases, when the mobile object is positioned in the unmanned process in which a worker is not present in the manufacture process and when the weight of the mobile object increases compared to the weight of the mobile object in a process prior to the unmanned process, it is possible to restrain time required to transport the mobile object from increasing.

Embodiment 13: In the embodiment, the control device may further include a position estimation section configured to estimate a position of the mobile object. The control command section may be configured to generate the control command by using a database and the estimated position of the mobile object, the database keeping information related to the control command and position information on the mobile object in association with each other. The information related to the control command in the database may be specified beforehand based on the vehicle state information corresponding to the position of the mobile object.

Since the control device in embodiment 13 generates the control command by using the database, which manages the information related to the control command and the position information on the mobile object in association with each other, and the estimated position of the mobile object, the control command can be easily generated by using the database. Accordingly, it is possible to easily restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 14: According to another embodiment of the present disclosure, a database is provided. The database includes: information related to a control command to cause a mobile object configured to travel by driverless driving to move in a manufacture process of manufacturing the mobile object; and position information on the mobile object, the information related to the control command and the position information on the mobile object being associated with each other. The information related to the control command is predetermined based on vehicle state information that is information related to at least one of: magnitude of impact force applied to the mobile object; a direction in which the impact force acts; weight of the mobile object; weight of a trailer configured to carry a part and configured to be coupled to the mobile object and move, the part being configured to be attached to the mobile object; and a process in which the mobile object is positioned.

The database in embodiment 14 can keep the information related to the control command predetermined based on the vehicle state information, and the information on the mobile object, in association with each other. Since the information related to the control command is predetermined, it is possible to omit arithmetic processing for generating the control command.

Embodiment 15: According to another embodiment of the present disclosure, a server device is provided. The server device includes the control device according to any one of embodiments 1 to 13.

Since the server device in embodiment 15 includes the control device according to any one of embodiments 1 to 13, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 16: According to another embodiment of the present disclosure, a server device is provided. The server device includes: the control device according to embodiment 13; and the database according to embodiment 14.

Since the server device in embodiment 16 includes the control device according to embodiment 13 and the database according to embodiment 14, the control command can be easily generated by using the database, and it is thus possible to easily restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 17: According to another embodiment of the present disclosure, a mobile object is provided. The mobile object includes a driving control section configured to perform driving control of the mobile object, according to the control command output from the server device according to embodiment 15.

Since the mobile object in embodiment 17 performs the driving control, according to the control command output from the server device according to embodiment 15, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 18: According to another embodiment of the present disclosure, a mobile object is provided. The mobile object includes a driving control section configured to perform driving control of the mobile object, according to the control command output from the server device according to embodiment 16.

The mobile object in embodiment 18 can perform the driving control, according to the control command generated by using the database, and it is thus possible to easily restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 19: According to another embodiment of the present disclosure, a mobile object is provided. The mobile object includes a driving control section configured to acquire a control command to cause the mobile object to move and configured to perform driving control of the mobile object by using the acquired control command. The driving control section is configured to execute: correcting the acquired control command by using information related to at least one of magnitude of impact force applied to the mobile object, a direction in which the impact force acts, weight of the mobile object, weight of a trailer configured to carry a part to be attached to the mobile object and configured to be removably coupled to the mobile object and move, and a process in which the mobile object is positioned; and performing the driving control, according to the corrected control command.

The mobile object in embodiment 19 executes: correcting the acquired control command by using the information related to at least one of the magnitude of impact force applied to the mobile object, the direction in which the impact force acts, the weight of the mobile object, the weight of the trailer, and the process in which the mobile object is positioned; and performing the driving control, according to the corrected control command. Accordingly, the control command output from the server device can be corrected on the mobile object side, and it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 20: According to another embodiment of the present disclosure, a mobile object is provided. The mobile object includes: the control device according to any one of embodiments 1 to 13; and a driving control section configured to perform driving control of the mobile object, according to the control command output from the control device.

The mobile object in embodiment 20 includes the control device according to any one of embodiments 1 to 13, and the driving control section that performs driving control of the mobile object, according to the control command output from the control device. Accordingly, without needing a server device, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 21: According to another embodiment of the present disclosure, a mobile object is provided. The mobile object includes: the control device according to embodiment 13; the database according to embodiment 14; and a driving control section configured to perform driving control of the mobile object, according to the control command output from the control device.

The mobile object in embodiment 21 includes the control device according to embodiment 13, the database according to embodiment 14, and the driving control section that performs driving control of the mobile object, according to the control command output from the control device. Accordingly, without needing a server device, the driving control can be performed according to the control command generated by using the database, and it is thus possible to easily restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 22: According to another embodiment of the present disclosure, a mobile object control system is provided. The mobile object control system includes: the server device according to embodiment 15; and the mobile object according to embodiment 17.

Since the mobile object control system in embodiment 22 includes the server device according to embodiment 15 and the mobile object according to embodiment 17, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 23: According to another embodiment of the present disclosure, a mobile object control system is provided. The mobile object control system includes: the server device according to embodiment 16; and the mobile object according to embodiment 18. Since the mobile object control system in embodiment 23 includes the server device according to embodiment 16 and the mobile object according to embodiment 18, the control command can be easily generated by using the database, and it is thus possible to easily restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 24: According to another embodiment of the present disclosure, a mobile object control system is provided. The mobile object control system includes: a server device configured to generate and output a control command to cause a mobile object configured to travel by driverless driving to move; and the mobile object according to embodiment 19.

In the mobile object control system in embodiment 24, the control command output from the server device can be corrected on the mobile object side, and it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 25: According to another embodiment of the present disclosure, a control method of controlling movement of a mobile object that is configured to travel by driverless driving and that is transported in a manufacture process of manufacturing the mobile object is provided. The control method includes generating a control command to cause the mobile object to move, by using vehicle state information that is information related to at least one of magnitude of impact force applied to the mobile object, a direction in which the impact force acts, weight of the mobile object, weight of a trailer configured to carry a part to be attached to the mobile object and configured to be coupled to the mobile object and move, and a process in which the mobile object is positioned.

According to the control method in embodiment 25, it is possible to restrain a deviation, in control of the movement of the mobile object by driverless driving, that can be caused by at least one of the magnitude of impact force applied to the mobile object, the direction in which the impact force acts, the weight of the mobile object, the weight of the trailer, and the process in which the mobile object is positioned.

Embodiment 26: According to another embodiment of the present disclosure, a trailer configured to carry a part configured to be attached to a mobile object configured to travel by driverless driving in a manufacture process of manufacturing the mobile object, is provided. The trailer includes: a coupling part configured to be coupled to the mobile object; a trailer drive part configured to cause the trailer to move dependently on movement of the mobile object in a coupled state in which the mobile object and the trailer are coupled together by the coupling part; a coupling detection section configured to detect whether or not the coupling part is in the coupled state; and a communication device configured to transmit a result of the detection by the coupling detection section to the control device according to any one of embodiments 1 to 13.

Since the trailer in embodiment 26 includes the coupling detection section that detects whether or not the coupling part is in the coupled state, and the communication device that transmits a result of the detection by the coupling detection section to the control device according to any one of embodiments 1 to 13, it is possible for the control device, by using the result of the detection by the coupling detection section, to restrain a deviation of an action of the mobile object that is caused by the coupled state of the trailer and the mobile object.

Embodiment 27: In the embodiment, the trailer may further include a drive control section configured to control driving of the trailer drive part. The drive control section may be configured to increase braking force of the trailer drive part when it is detected by the coupling detection section that the coupling part changes from the coupled state to a non-coupled state in which the mobile object and the trailer are not coupled together by the coupling part.

Since the trailer in embodiment 27 increases the braking force of the trailer drive part when it is detected by the coupling detection section that the coupling part changes from the coupled state to the non-coupled state in which the mobile object and the trailer are not coupled together by the coupling part, it is possible to cause the trailer to immediately leave the vicinity of the mobile object, and it is thus possible to restrain the trailer from obstructing the transport of the mobile object.

Embodiment 28: In the embodiment, the drive control section may be configured to, after increasing the braking force, control the trailer drive part in such a manner as to move the trailer to a process prior to a process in which the trailer is positioned in the manufacture process.

According to the trailer in embodiment 28, it is possible to cause the trailer to accompany another mobile object transported from a prior process.

Embodiment 29: In the embodiment, the trailer may further include: a process information acquisition section configured to acquire information indicating whether or not the mobile object has completed a coupled-state process predetermined as a process that is executed in the coupled state in the manufacture process; and a coupling control section configured to, when the mobile object has completed the coupled-state process, control the coupling part in such a manner as to bring about a non-coupled state in which the mobile object and the trailer are not coupled together.

Since the trailer in the embodiment 29 controls the coupling part in such a manner as to bring about the non-coupled state in which the mobile object and the trailer are not coupled together when the mobile object has completed the coupled-state process, it is possible, in a process other than the coupled-state process, to prevent occurrence of a deviation of an action of the mobile object that is caused by the coupling between the trailer and the mobile object.

Embodiment 30: According to another embodiment of the present disclosure, a trailer control system is provided. The trailer control system includes: the control device according to any one of embodiments 1 to 13; and the trailer according to embodiment 29. The control device further includes: a determination section configured to determine whether or not the mobile object has completed the coupled-state process in the manufacture process; and a notice output section configured to, when the mobile object has completed the coupled-state process, output a coupling releasing notice instructing that the coupled state be released. The coupling control section is configured to, when the coupling releasing notice is received, control the coupling part in such a manner as to bring about the non-coupled state.

Since the trailer control system in embodiment 30 controls the coupling part in such a manner as to bring about the non-coupled state in which the mobile object and the trailer are not coupled together when the mobile object has completed the coupled-state process, it is possible, in a process other than the coupled-state process, to prevent occurrence of a deviation of an action of the mobile object that is caused by the coupling between the trailer and the mobile object.

The present disclosure can also be implemented in various embodiments other than the control device, the database, the server device, the mobile object, the mobile object control system, the control method, the trailer, and the trailer control system. For example, the present disclosure can be implemented in embodiments as a remote control device, a mobile object transport system, a database management device, a database system, a control device and a control method for a trailer, a mobile object transport method, a control method for the transport system, a computer program for implementing any of the control methods and the database, a non-transitory recording medium storing the computer program, and the like.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 5 is a flowchart showing a method for driving a vehicle in the first embodiment;

FIG. 9 is a flowchart showing a procedure for the vehicle control method implemented by the remote control device in the first embodiment;

FIG. 10 is a top view of the vehicle;

DETAILED DESCRIPTION OF EMBODIMENTS

A. First Embodiment

Figure 1:
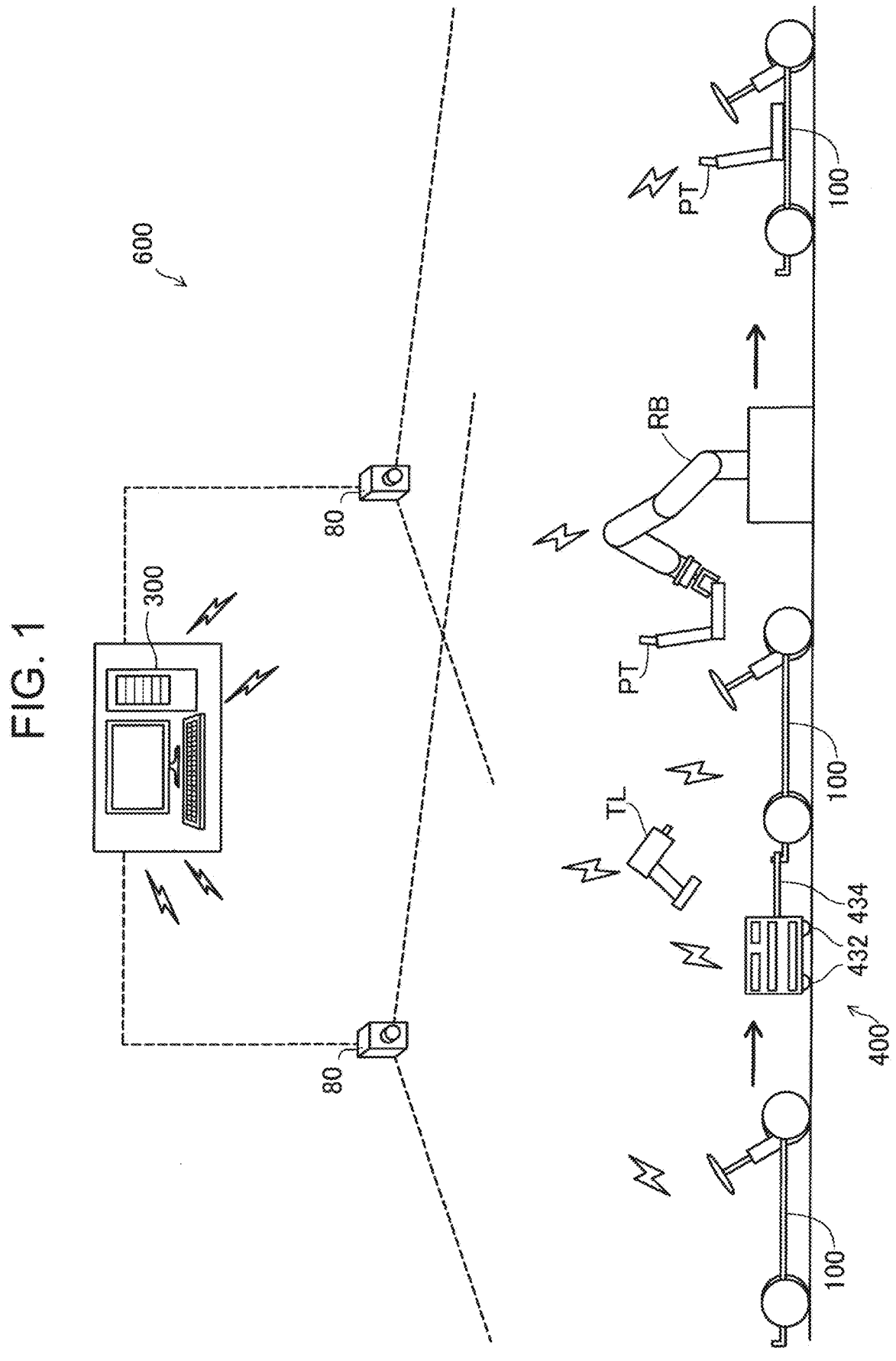
FIG. 1 is an explanatory diagram showing a schematic configuration of a vehicle control system as a control system in a first embodiment.

A-1. System Configuration:

FIG. 1 is an explanatory diagram showing a schematic configuration of a vehicle control system 600 as a mobile object control system in a first embodiment. For example, the vehicle control system 600 is used in a factory where vehicles 100 are manufactured. An object to be transported by the vehicle control system 600 is a vehicle 100 that can be driven by remote control. In the present embodiment, the vehicle control system 600 is used in a process of assembling a vehicle 100 in a manufacture process of manufacturing the vehicle 100, and transports the vehicle 100 that is in a platform state over a predetermined segment of transport. The term "platform state" refers to a state in which three functions of "traveling", "turning", and "stopping" become able to be fulfilled by remote control. More specifically, the term "platform state" refers to a state in which interior parts, such as a driver seat and a dashboard, are not mounted, exterior parts, such as a bumper and a fender, are not mounted, and a bodyshell is not mounted. For a vehicle 100 in the platform state, the remaining parts, such as the bodyshell, may be mounted onto the vehicle 100 by a time when the vehicle 100 is shipped from the factory, or the remaining parts, such as the bodyshell, may be mounted onto the vehicle 100 after the vehicle 100 in a state of being unequipped with the remaining parts, such as the bodyshell, is shipped from the factory. Processes, such as inspection and assembly, are conducted by a worker, equipment, and the like onto a vehicle 100 being transported. Each part may be mounted in an arbitrary direction, such as from an upper side, a lower side, a front side, a rear side, a right side, or a left side of the vehicle 100, may be mounted in the same direction, or may be mounted in different directions from each other.

As shown in FIG. 1, a part PT is mounted onto a vehicle 100 in the platform state by an installation robot RB and the part PT is fixed to the vehicle 100 by using a fixing tool TL held by a worker while the vehicle 100 is being transported by remote control by the vehicle control system 600, and then the vehicle 100 moves to a next process. Although only one installation robot RB is depicted in FIG. 1, a plurality thereof may be installed depending on the types of parts PT to be attached to the vehicle 100. Note that the part PT may be fixed to the vehicle 100, not by using the fixing tool TL, but by being fitted into or onto an undepicted fitting part formed on the vehicle 100 beforehand when the part PT is mounted onto the vehicle 100 by the installation robot RB.

In the present embodiment, the fixing tool TL is configured as an impact wrench, mutually communicates with a remote control device 300, and is configured to be able to output an action state and a fastening torque to the remote control device 300. The installation robot RB is configured as a multi-joint robot having a gripper, and mutually communicates with the remote control device 300. The installation robot RB receives a control command output from the remote control device 300 and performs action of installing the part PT according to the control command, which will be described later. The installation robot RB is configured to be able to output, to the remote control device 300, information indicating whether or not it is completed to mount the part PT onto the vehicle 100, the weight of the part PT, an impact force occurring when the part PT is mounted onto the vehicle 100, and the like. The communication between the fixing tool TL and the remote control device 300 and the communication between the installation robot RB and the remote control device 300 may be implemented by any of arbitrary wired and wireless methods.

In at least a partial segment of the segment of transport by remote control, the vehicle 100 tows a trailer 400 that carries various parts to be installed onto the vehicle 100, with the trailer 400 coupled to the vehicle 100. The towing of the trailer 400 may be implemented not only in a positional relation in which the trailer 400 is positioned behind the vehicle 100, but in a positional relation in which the trailer 400 is positioned in front of or on a side to the vehicle 100. In the present embodiment, the trailer 400 carries relatively small fixing parts, such as a bolt and the like that are attached by a worker to fix the part PT to the vehicle 100. Note that the trailer 400 may carry a large part such as a seat or a bodyshell to be mounted onto the vehicle 100 by the installation robot RB. The trailer 400 includes wheels 432 and a coupling part 434. The coupling part 434 is removably connected to a tow hook installed beforehand on the vehicle 100 being transported, or to any protrusion that the vehicle 100 has, whereby the trailer 400 is towed by the vehicle 100. The coupling part 434 is configured as, for example, a belt or a hook, and is removed from the vehicle 100 when the transport of the vehicle 100 over the predetermined segment is completed, whereby the coupling is released. In the description below, a state in which the trailer 400 and the vehicle 100 are coupled together by the coupling part 434 is also referred to as "coupled state". A state in which the coupled state is released and the trailer 400 and the vehicle 100 are not coupled is also referred to as "non-coupled state". The wheels 432 correspond to "trailer drive part" in the present disclosure.

Figure 2:
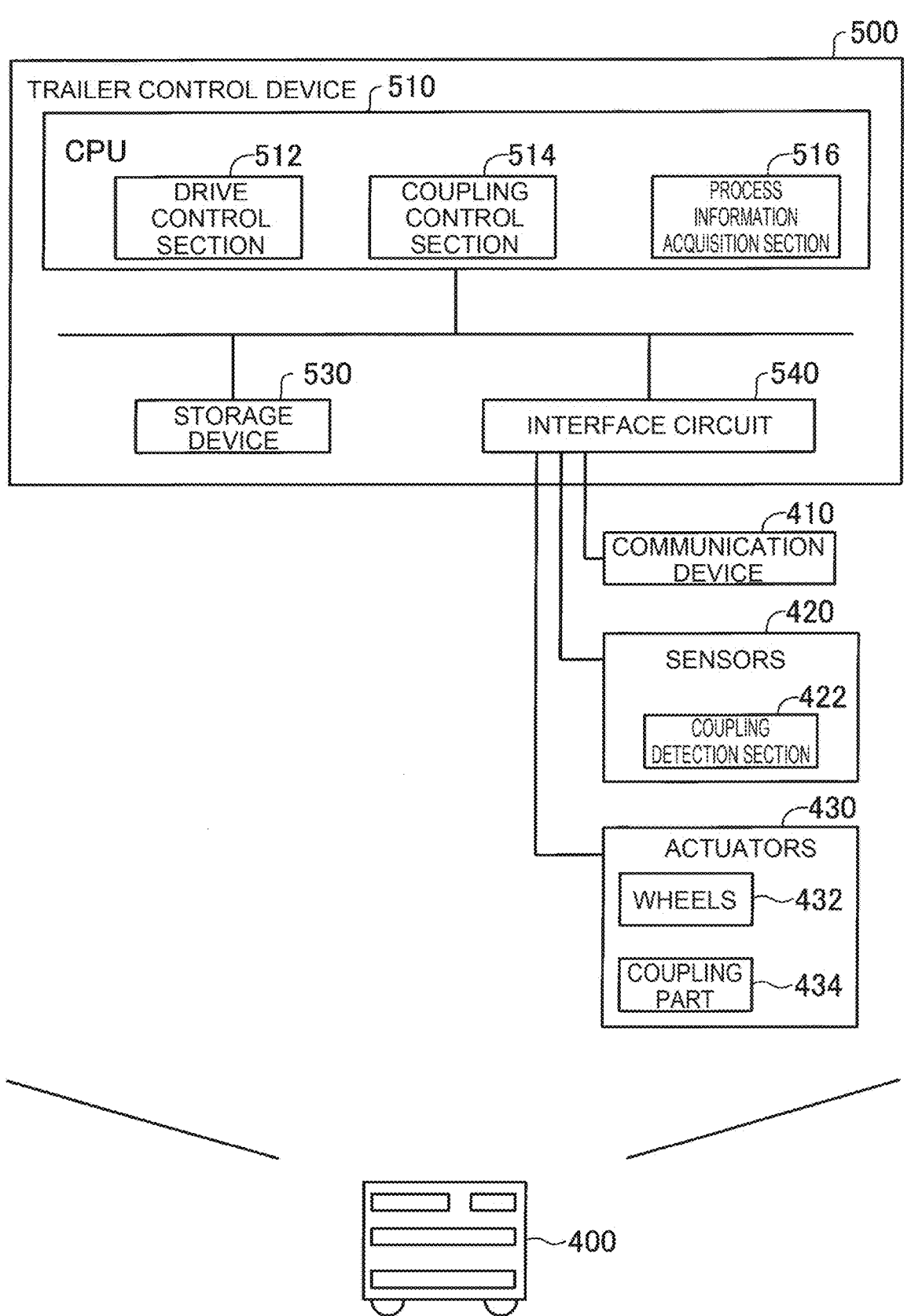
FIG. 2 is a block diagram showing a schematic configuration of a trailer in the first embodiment.

FIG. 2 is a block diagram showing a schematic configuration of the trailer 400 in the first embodiment. A trailer control device 500 is mounted in the trailer 400 and performs various control of the trailer 400. The trailer control device 500 is configured as an electronic control unit (ECU) including: a CPU 510 as a central processing device; a storage device 530 such as a hard disk drive (HDD), a solid state drive (SSD), an optical recording medium, a RAM, or a ROM; and an interface circuit 540. The CPU 510, the storage device 530, and the interface circuit 540 are connected through an internal bus in such a manner as to be able to perform bi-directional communication. A communication device 410, sensors 420, and actuators 430 are connected to the interface circuit 540. The communication device 410 performs wireless communication, via an access point or the like in the factory, with an external device connected to a network, such as the remote control device 300, outside of the vehicle 100.

The sensors 420 are used for various control of the trailer 400 by the trailer control device 500. In the present embodiment, the sensors 420 includes a coupling detection section 422 that detects which state of the coupled state and the non-coupled state the coupling part 434 is in. For example, the coupling detection section 422 is configured as a pressure sensor installed at a contact portion between the coupling part 434 and the vehicle 100, or a distance measurement sensor that detects the distance between the trailer 400 and the vehicle 100. A result of the detection by the coupling detection section 422 is output to the remote control device 300 and the CPU 510.

A computer program for implementing at least part of functionality provided in the present embodiment is stored in the storage device 530. The CPU 510 functions as a drive control section 512, a coupling control section 514, and a process information acquisition section 516 by executing various computer programs stored in a memory.

The process information acquisition section 516 acquires information indicating whether or not the vehicle 100 has completed a coupled-state process predetermined as a process to be executed in the coupled state in the manufacture process. The drive control section 512 controls driving of actuators related to drive control of the wheels 432 included in the trailer 400, among the actuators 430. The "actuators related to drive control of the wheels 432" include an actuator of an undepicted drive device that drives the wheels 432, an actuator of an undepicted braking device that causes braking force for decelerating the wheels 432, and an actuator of an undepicted steering system for changing the traveling direction of the wheels 432. In the present embodiment, the drive control section 512 drives the wheels 432 to cause the trailer 400 to travel, by driving the wheels 432 depending on whether or not the coupled-state process is completed and on the state of the coupling part 434 detected by the coupling detection section 422. In the present embodiment, when the coupling part 434 is in the coupled state, the drive control section 512 does not drive the wheels 432 with the actuators, and the wheels 432 dependently move by being towed by the vehicle 100.

The coupling control section 514 controls driving of an actuator related to control of the coupling part 434 included in the trailer 400, among the actuators 430. In the present embodiment, the coupling control section 514 implements switching between the coupled state and the non-coupled state of the coupling part 434, by controlling the coupling part 434 depending on whether or not the coupled-state process is completed. Specific control related to the drive control section 512, the coupling control section 514, and the process information acquisition section 516 will be described later.

Figure 3:
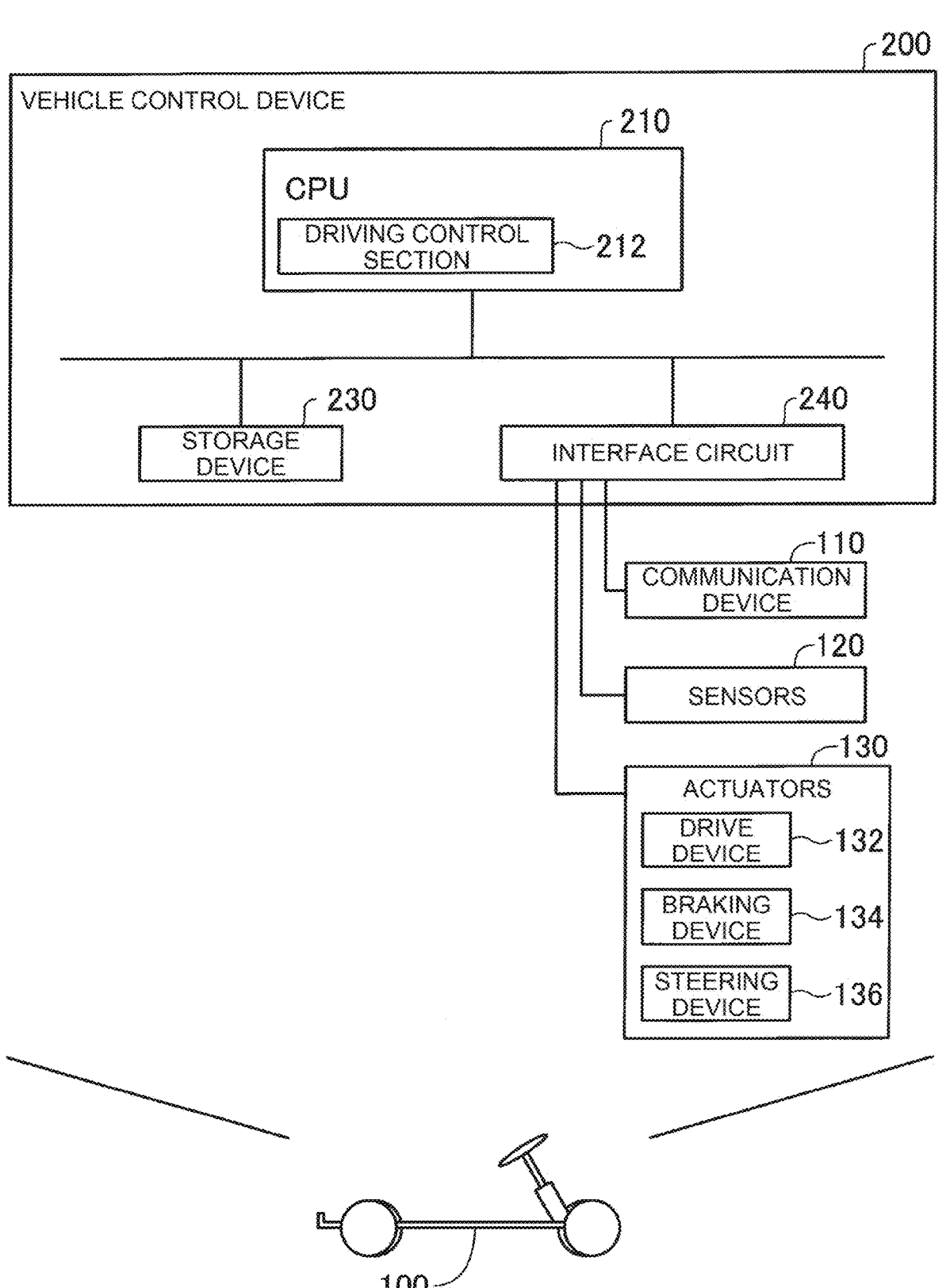
FIG. 3 is a block diagram showing a schematic configuration of a vehicle in the first embodiment.

FIG. 3 is a block diagram showing a schematic configuration of the vehicle 100 in the first embodiment. Examples of the vehicle 100 are a passenger car, a motor truck, a bus, a construction vehicle, and the like. In the present embodiment, the vehicle 100 is a battery electric vehicle (BEV) that can travel by driverless driving. The term "driverless driving" refers to driving not based on driving operations by an occupant. A driving operation refers to an operation related to at least any one of "traveling", "turning", and "stopping" of the vehicle 100. The driverless driving is implemented by automatic or manual remote control using a device installed outside of the vehicle 100, or by autonomous control by the vehicle 100. An occupant who does not perform driving operations may be on board the vehicle 100 that is traveling by driverless driving. Examples of the occupant who does not perform driving operations include a person who simply sits in a seat of the vehicle 100 and a person who does work different from driving operations, such as installation, inspection, or operation of switches, while on board the vehicle 100. Note that driving based on driving operations by an occupant is referred to as "manned driving" in some cases. The vehicle 100 includes a communication device 110, sensors 120, actuators 130, and a vehicle control device 200.

The vehicle control device 200 is mounted in the vehicle 100 and performs various control of the vehicle 100. The vehicle control device 200 is configured as an ECU including: a CPU 210 as a central processing device; a storage device 230 such as a RAM, a ROM, an HDD, or an SSD; and an interface circuit 240. The CPU 210, the storage device 230, and the interface circuit 240 are connected through an internal bus in such a manner as to be able to perform bi-directional communication. The actuators 130, the sensors 120, and the communication device 110 are connected to the interface circuit 240. The communication device 110 performs wireless communication, via an access point or the like in the factory, with an external device connected to the network, such as the remote control device 300, outside of the vehicle 100.

A computer program for implementing at least part of the functionality provided in the present embodiment is stored in the storage device 230. The CPU 210 executes various computer programs stored in a memory, whereby functions such as a driving control section 212 are implemented.

The driving control section 212 performs driving control of the vehicle 100. The term "driving control" refers to various controls, such as adjustment of acceleration rate, speed, steering angle, and turning angle, for driving the actuators 130 that fulfill the functions of "traveling", "turning", and "stopping" of the vehicle 100. In the present embodiment, the actuators 130 include an actuator of a drive device 132 for accelerating the vehicle 100, an actuator of a braking device 134 for decelerating the vehicle 100, and an actuator of a steering device 136 for changing the traveling direction of the vehicle 100. The actuators 130 may include an actuator for swinging a wiper of the vehicle 100, an actuator for opening and closing a power window of the vehicle 100, and the like.

The actuator of the drive device 132 includes an undepicted battery for traveling, an undepicted traction motor driven by electric power from the battery for traveling, and four wheels. The traction motor is an example of a prime mover. The wheels rotate by using power transmitted from the traction motor. Another type of prime mover, such as an internal combustion engine or an external combustion engine, may be provided in place of the traction motor.

When a driver is on board the vehicle 100, the driving control section 212 can cause the vehicle 100 to travel by controlling the actuators 130 according to operations by the driver. The driving control section 212 can also cause the vehicle 100 to travel by controlling the actuators 130 according to a control command transmitted from the remote control device 300, regardless of whether or not a driver is on board the vehicle 100.

The sensors 120 are general sensors used for driving control of the vehicle 100. In the present embodiment, results of measurement by the sensors 120 are transmitted to the vehicle control device 200. Note that the vehicle 100 in the platform state does not need to include the sensors 120.

As shown in FIG. 1, the vehicle control system 600 includes vehicle detectors 80 and the remote control device 300. Each vehicle detector 80 is a device for measuring vehicle information. The term "vehicle information" refers to information such as an image of the vehicle 100 or three-dimensional point cloud data on the vehicle 100, used to estimate at least any one of the position of the vehicle 100 and the orientation of the vehicle 100. The term "three-dimensional point cloud data" refers to data indicating three-dimensional positions of a point cloud. In the present embodiment, each vehicle detector 80 is configured as a camera and acquires an image of the vehicle 100 as the vehicle information.

Each vehicle detector 80 is connected to the remote control device 300 communicably through wireless communication or wired communication. The remote control device 300 can acquire, in real time, a relative position and a relative orientation of the vehicle 100 with respect to a target route, by acquiring vehicle information from the vehicle detectors 80.

Figure 4:
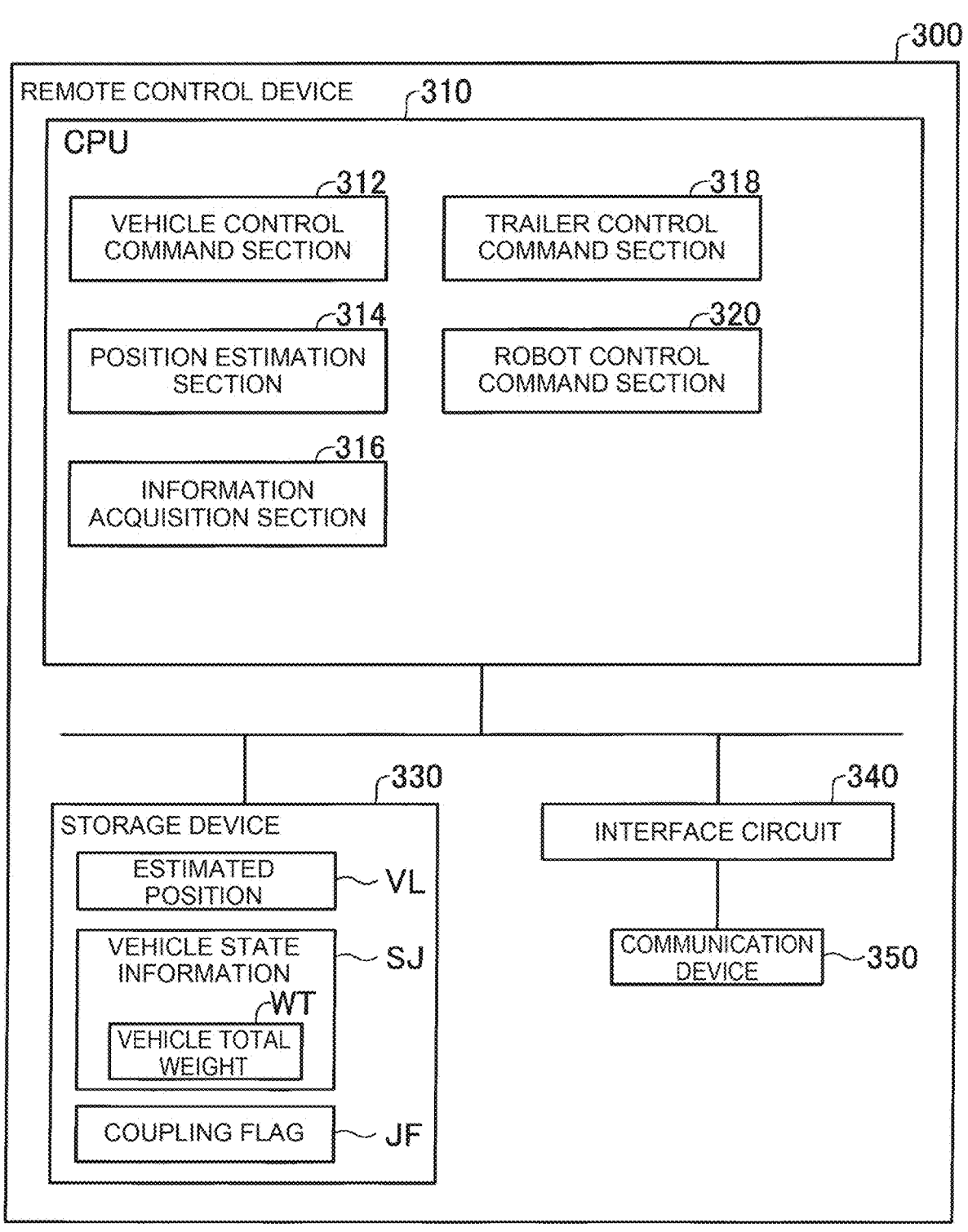
FIG. 4 is a block diagram showing an internal functional configuration of a remote control device in the first embodiment.

FIG. 4 is a block diagram showing an internal functional configuration of the remote control device 300 in the first embodiment. The remote control device 300 generates, and transmits to the vehicle 100, a control command to cause the vehicle 100 to automatically drive by remote control, and performs driving control of the vehicle 100 by remote control. The remote control device 300 performs transport and the like of the vehicle 100 over the segment of transport in the factory, for example, by causing the vehicle 100 to automatically drive by remote control. Moreover, in the present embodiment, the remote control device 300 generates control commands for causing the installation robot RB and the trailer 400 to operate by remote control, and transmits the control commands to the installation robot RB and the trailer control device 500, respectively. The remote control device 300 corresponds to "server device" in the present disclosure.

The remote control device 300 is configured as an ECU including a CPU 310 as a central processing device, a storage device 330, an interface circuit 340, and a communication device 350. The CPU 310, the storage device 330, and the interface circuit 340 are connected through an internal bus in such a manner as to be able to perform bi-directional communication. The communication device 350 is connected to the interface circuit 340. The communication device 350 performs communication with the vehicle 100, the trailer control device 500, and the installation robot RB via the network or the like.

Examples of the storage device 330 are a RAM, a ROM, an HDD, an SSD, and the like. An estimated position VL, which will be described later, is stored in a readable-writable area of the storage device 330. Moreover, a computer program for implementing at least part of the functionality provided in the present embodiment is stored in the storage device 330. The computer program stored in the storage device 330 is executed by the CPU 310, whereby the CPU 310 functions as a vehicle control command section 312, a position estimation section 314, an information acquisition section 316, a trailer control command section 318, and a robot control command section 320. However, one or some, or all, of such functions may be configured by using a hardware circuit.

The position estimation section 314 estimates a relative position and a relative orientation of the vehicle 100 by analyzing a video acquired by a vehicle detector 80. The vehicle control command section 312 can estimate the position of the vehicle 100 and the orientation of the vehicle 100 by using a captured image acquired by a camera as the vehicle detector 80. The position of the vehicle 100 can be acquired, for example, by calculating coordinates of a measurement point on the vehicle 100 in an image coordinate system by using an outer shape of the vehicle 100 detected from the captured image, and transforming the calculated coordinates into coordinates in a global coordinate system. The orientation of the vehicle 100 can be estimated, for example, by using an optical flow method, based on the orientation of a vector of the moving vehicle 100 calculated from changes in position of a characteristic point of the vehicle 100 between frames of the captured image. The orientation of the vehicle 100 may be calculated, for example, by using a result of output from a yaw rate sensor or the like mounted in the vehicle 100.

The outer shape of the vehicle 100 included in the captured image can be detected, for example, by inputting the captured image into a detection model that uses artificial intelligence. For the detection model, for example, a trained machine learning model that is trained in such a manner as to implement any one of semantic segmentation and instance segmentation can be named. For the machine learning model, for example, a convolutional neural network (hereinafter, CNN) that is trained through supervised learning using a learning dataset can be used. The learning dataset includes, for example, a plurality of training images including vehicles 100, and correct labels each indicating that each area in the training image is either an area showing a vehicle 100 or an area showing something other than a vehicle 100. Note that when the CNN learns, it is preferable that parameters of the CNN be updated by back propagation such that an error between an output result of the detection model and a correct label decreases.

The information acquisition section 316 acquires vehicle state information SJ. The term "vehicle state information SJ" refers to information related to at least one of the magnitude of impact force applied to the vehicle 100, a direction in which the impact force acts, the weight of the vehicle 100, the weight of the trailer 400, and a process in which the vehicle 100 is positioned. More specifically, the vehicle state information SJ includes information indicating the type of a part PT to be attached in each process in the manufacture process, the weight of the part PT to be attached in each process, the magnitude and direction of impact force occurring when each part PT is attached to the vehicle 100, a timing when the trailer 400 starts to be coupled or when the coupling is released, the weight of the trailer 400 in each process, or the like. In the present embodiment, the information acquisition section 316 acquires the vehicle state information SJ stored in the storage device 330 beforehand from the storage device 330.

Each element used for the vehicle state information SJ in the present embodiment, and an effect that each element exerts on the drive state of the vehicle 100 are described specifically. When each part PT is attached to the vehicle 100, the weight of each part PT is added, and the total weight of the vehicle 100 increases. When the total weight of the vehicle 100 increases, friction force against a road surface increases, drive resistance in the drive device 132 increases, and the vehicle 100 therefore decelerates. Moreover, when the total weight of the vehicle 100 increases, drive torque required to achieve a predetermined acceleration rate and braking force required to achieve a predetermined deceleration rate increase. In the present embodiment, the information acquisition section 316 adds the weight of the part PT attached in each process, and stores a vehicle total weight WT as the total weight of the vehicle 100 in the storage device 330. Note that the vehicle total weight WT is included in the vehicle state information SJ. Vehicle total weights WT may be stored beforehand as the vehicle state information SJ in the storage device 330, in association with positions of the vehicle 100.

In the present embodiment, the "impact force occurring when each part PT is attached to the vehicle 100" refers to impact force that stems from force produced when a part PT is mounted onto the vehicle 100 by the installation robot RB and comes into contact with the vehicle 100, force acting when the part PT is attached to the vehicle 100 by using the fixing tool TL, and force acting when the trailer 400 is coupled to the vehicle 100. Note that a type of impact force used for the vehicle state information SJ may be at least one of the foregoing forces. Moreover, the "magnitude and direction of impact force" can be identified beforehand by simulation, as a magnitude of impact force and a direction in which the impact force acts when a part PT is attached to the vehicle 100, with a part weight, at a contact speed, in a contact direction, and with a fixing force that are prescribed beforehand for each type of part PT, and as a magnitude of impact force and a direction in which the impact force acts when the trailer 400 with a weight prescribed beforehand is coupled to the vehicle 100 that is traveling at a prescribed speed. The impact force-related information as described above corresponds to "impact force information" in the present disclosure.

Impact force affects the drive state of the vehicle 100, depending on a direction in which the impact force acts. More specifically, impact force that acts in the traveling direction of the vehicle 100 acts as force accelerating the vehicle 100, and accelerates the vehicle 100. On the other hand, impact force that acts in the opposite direction to the traveling direction of the vehicle 100 acts as force decelerating the vehicle 100, and decelerates the vehicle 100. Impact force that acts in a perpendicular direction to the traveling direction of the vehicle 100 increases friction force between the vehicle 100 and a road surface and drive resistance in the drive device 132, and decelerates the vehicle 100.

The "weight of the trailer 400" includes the weights of various parts carried by the trailer 400. A weight of the trailer 400 is preset for each process because the trailer 400 becomes lighter in more subsequent processes in the manufacture process as parts PT carried by the trailer 400 are attached to the vehicle 100. Note that when a part PT carried by the trailer 400 is a small part PT such as a bolt, a weight of the trailer 400 may be set as a constant value because a change in weight of the trailer 400 between processes is trivial.

When the trailer 400 is coupled to the vehicle 100, friction force acting between a road surface and the trailer 400 acts on the vehicle 100, and the vehicle 100 therefore decelerates. Moreover, drive torque required to achieve a predetermined acceleration rate and braking force required to achieve a predetermined deceleration rate increase. When the state in which the trailer 400 and the vehicle 100 are coupled is released, since the friction force acting between the road surface and the trailer 400 ceases acting on the vehicle 100, the force decelerating the vehicle 100 is lost, and the vehicle 100 accelerates.

The vehicle control command section 312 generates a control command to cause the vehicle 100 to perform various actions and outputs the control command to the vehicle 100. For example, the vehicle control command section 312 generates a control command to cause the vehicle 100 to automatically drive by remote control, by using the estimated position and orientation of the vehicle 100, that is, the estimated position VL, and transmits the control command to the vehicle 100. The control command is, for example, a command to cause the vehicle 100 to travel according to a target route stored in the storage device 330. The control command can be generated as a travel control signal including control command values indicating a driving force or a braking force and a steering angle or a turning angle, respectively. When the vehicle 100 receives the travel control signal as a request for remote control, driving control is implemented by the driving control section 212 of the vehicle control device 200, and as a result, the vehicle 100 automatically drives.

FIG. 5 is a flowchart showing a method for driving the vehicle 100 in the first embodiment. In FIG. 5, a flow on the left shows processes that are executed by the remote control device 300, and a flow on the right shows processes that are executed by the vehicle 100. In step S110, the vehicle control command section 312 acquires position information indicating the position and orientation of the vehicle 100 by using a result of detection by a vehicle detector 80. In the present embodiment, the position of the vehicle 100 includes X, Y, Z coordinates in the global coordinate system of the factory. The position of each vehicle detector 80 is adjusted beforehand. The vehicle control command section 312 detects the position of the vehicle 100 from the result of detection acquired from the vehicle detector 80, and acquires position information on the vehicle 100 in the factory from the detected position of the vehicle 100.

In step S120, the vehicle control command section 312 decides on a target position for the vehicle 100 to head for next. In the present embodiment, the target position is represented by X, Y, Z coordinates in the global coordinate system of the factory. A target route, which is a path for the vehicle 100 to travel along, is stored beforehand in the storage device 330 of the remote control device 300. The target route is represented by a node indicating a departure point, a node indicating a waypoint, a node indicating a destination, and links connecting each node. The vehicle control command section 312 decides on the target position for the vehicle 100 to head for next, by using the position information on the vehicle 100 and the target route. The vehicle control command section 312 decides on the target position on the target route ahead of the current position of the vehicle 100.

In step S130, the vehicle control command section 312 generates a travel control signal for causing the vehicle 100 to travel toward the decided target position. In the present embodiment, the travel control signal includes an acceleration rate and a steering angle of the vehicle 100 as parameters. The vehicle control command section 312 calculates the traveling speed of the vehicle 100 from changes in position of the vehicle 100, and compares the calculated traveling speed with a predetermined target speed of the vehicle 100. The vehicle control command section 312 decides on an acceleration rate such as to cause the vehicle 100 to accelerate when the traveling speed is less than the target speed, and decides on an acceleration rate such as to cause the vehicle 100 to decelerate when the traveling speed is more than the target speed. The vehicle control command section 312 decides on a steering angle such as to cause the vehicle 100 not to deviate from the target route when the vehicle 100 is positioned on the target route, and decides on a steering angle such as to cause the vehicle 100 to return to the target route when the vehicle 100 is not positioned on the target route, in other words, when the vehicle 100 deviates from the target route.

In step S140, the vehicle control command section 312 transmits the generated travel control signal to the vehicle 100. The vehicle control command section 312 repeats the cycle of acquiring the position of the vehicle 100, deciding on a target position, generating a travel control signal, transmitting the travel control signal, and the like, in each predetermined period.

The driving control section 212 of the vehicle 100 receives the travel control signal from the vehicle control command section 312 in step S150, controls the actuators 130 by using the received travel control signal in step S160, and thereby causes the vehicle 100 to travel at the acceleration rate and the steering angle indicated by the travel control signal. The driving control section 212 repeats the cycle of receiving a travel control signal and controlling the actuators 130, in each predetermined period. By causing the vehicle 100 to travel by remote control as described above, it is possible to move the vehicle 100 without using transport equipment such as a crane or a conveyor.

In the present embodiment, the vehicle control command section 312 generates a control command by using the above-mentioned vehicle state information SJ in such a manner as to restrain a change in speed of the vehicle 100 that changes as described above due to impact force, attachment of a part PT to the vehicle 100, coupling of the trailer 400 to the vehicle 100, and release of the coupling between the trailer 400 and the vehicle 100. The control command that restrains a change in speed may be generated from scratch, with the vehicle state information SJ taken into consideration, or may be generated by adding, to a control command generated without the vehicle state information SJ taken into consideration, a correction value generated with the vehicle state information SJ taken into consideration. The vehicle control command section 312 corresponds to "control command section" in the present disclosure.

Figure 6:
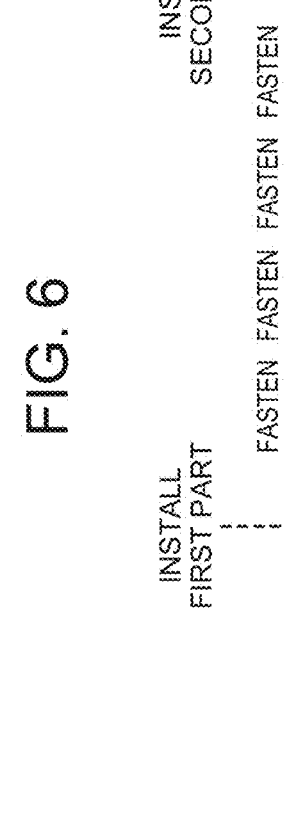
FIG. 6 is an explanatory diagram showing an example of control commands generated in such a manner as to restrain changes in speed in connection with attachment of parts to the vehicle.
Figure 7:
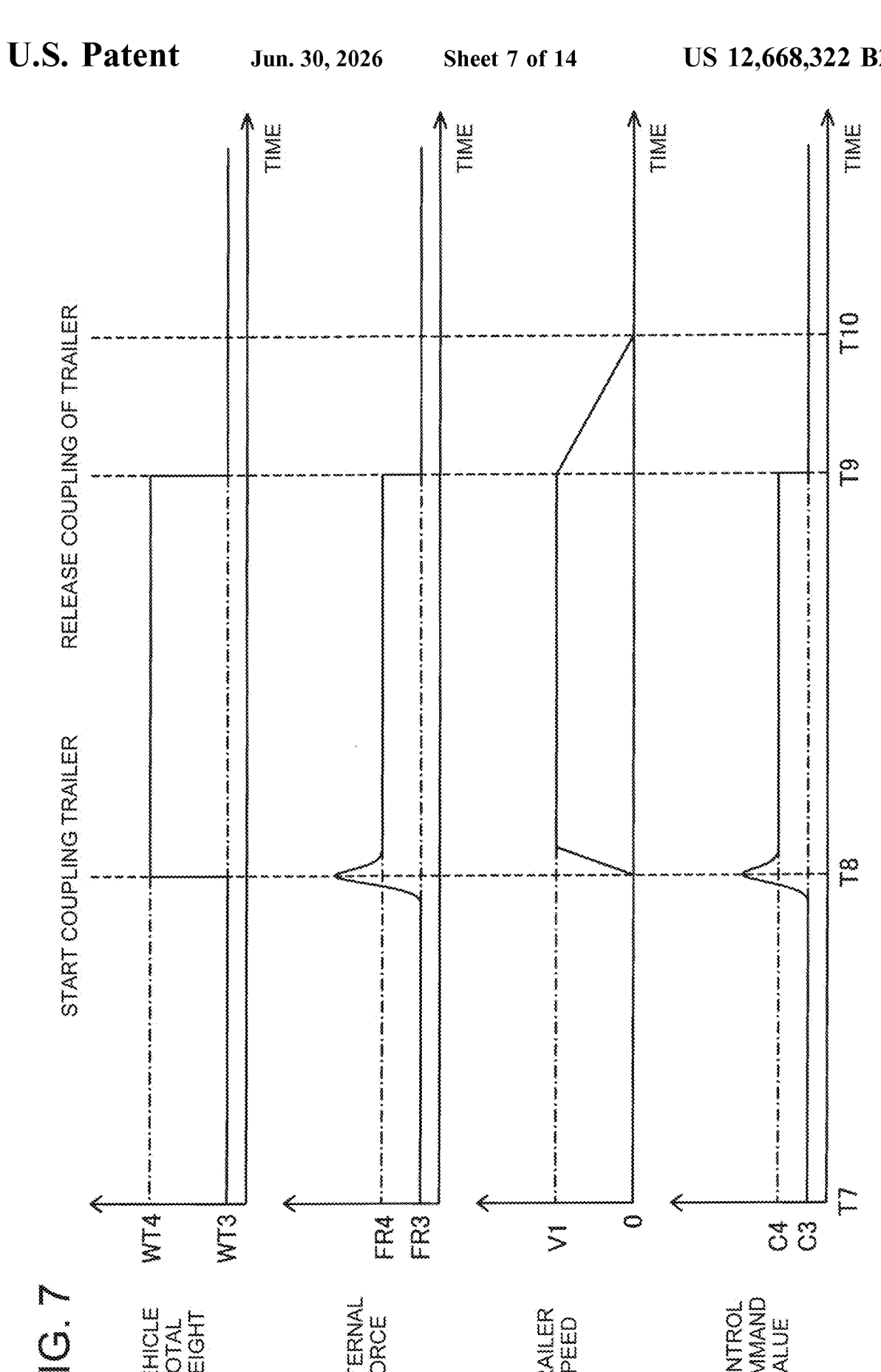
FIG. 7 is an explanatory diagram showing an example of control commands generated in such a manner as to restrain changes in speed in connection with coupling of the trailer to the vehicle.

Examples of the generation, by the vehicle control command section 312, of such a control command as to restrain a change in speed are described more specifically with reference to FIGS. 6 and 7. FIG. 6 is an explanatory diagram showing an example of control commands generated in such a manner as to restrain changes in speed in connection with attachment of parts PT to the vehicle 100. FIG. 7 is an explanatory diagram showing an example of control commands generated in such a manner as to restrain changes in speed in connection with coupling of the trailer 400 to the vehicle 100.

First, a description is given with reference to FIG. 6. In FIG. 6, horizontal axes represent time, and vertical axes represent vehicle total weight WT, external force acting on the vehicle 100, and control command value, respectively. In the example shown in FIG. 6, the "external force acting on the vehicle 100" refers to the sum of impact force acting on the vehicle 100 and the total weight of parts PT installed in the vehicle 100. In FIG. 6, the external force acting on the vehicle 100 in directions in which the vehicle 100 decelerates are shown as positive values. The control command value refers to a value indicating a driving force for causing the vehicle 100 at each time to travel at a prescribed speed. The larger the control command value is, the large the required driving force is.

At time T0, the vehicle total weight WT, the magnitude of external force, and the control command value are a vehicle total weight WT0, an external force FR0, and a control command value C0, respectively. Here, the external force FR0 is a gravity attracting the vehicle 100 having the vehicle total weight WT0, and the control command value C0 refers to a control command value indicating a driving force for causing the vehicle 100 on which the external force FR0 acts to travel at the prescribed speed.

At time T1, a first part is mounted onto the vehicle 100. With the addition of the weight of the first part, the vehicle total weight WT increases from the vehicle total weight WT0 to a vehicle total weight WT1. The external force increases from the external force FR0 to an external force FR1. The external force FR1 is a gravity attracting the vehicle 100 having the vehicle total weight WT1. More specifically, at the time of mounting the first part onto the vehicle 100, the first part is held by the installation robot RB and comes into contact with the vehicle 100 at a predetermined speed. Accordingly, with the temporary addition of impact force due to the contact, the external force acting on the vehicle 100 temporarily becomes larger than the external force FR1 and, when the speed of the first part becomes zero, converges on the external force FR1. The control command value is generated in such a manner as to increase from the control command value C0 to a control command value C1. The control command value C1 refers to a control command value indicating a driving force for causing the vehicle 100 on which the external force FR1 acts to travel at the prescribed speed. More specifically, the control command value is generated in such a manner as to temporarily indicate a larger value than the control command value C1 to correspond to the change in external force, and then converge on the control command value C1.

In the example shown in FIG. 6, the first part, after mounted onto the vehicle 100, is fastened in four places by using an impact wrench as the fixing tool TL at times T2, T3, T4, T5, one place at a time. At each of times T2, T3, T4, T5, impact force is applied to the vehicle 100 in a vertically downward direction, and the external force temporarily becomes larger than the external force FR1. The control command value is generated in such a manner as to also temporarily indicate a larger value than the control command value C1 to correspond to such a change in external force, and then converge on the control command value C1. Note that although the external force temporarily becomes larger than the external force FR1 because in the example shown in FIG. 6, the impact force is applied in the vertically downward direction in which gravity acts, the external force temporarily becomes smaller than the external force FR1 when the impact force is applied vertically upward. In such a case, the control command value is generated in such a manner as to also temporarily become smaller than the control command value C1 to correspond to such a change in external force.

At time T6, a second part is mounted onto the vehicle 100. With the addition of the weight of the second part, the vehicle total weight WT increases from the vehicle total weight WT1 to a vehicle total weight WT2. The external force increases from the external force FR1 to an external force FR2. The external force FR2 is a gravity attracting the vehicle 100 having the vehicle total weight WT2. More specifically, at the time of mounting the second part onto the vehicle 100, the second part is, similarly to the first part, held by the installation robot RB and comes into contact with the vehicle 100 at a predetermined speed. Accordingly, with the temporary addition of impact force due to the contact, the external force acting on the vehicle 100 temporarily becomes larger than the external force FR2 and, when the speed of the second part becomes zero, converges on the external force FR2. The control command value is generated in such a manner as to increase from the control command value C1 to a control command value C2. The control command value C2 refers to a control command value indicating a driving force for causing the vehicle 100 on which the external force FR2 acts to travel at the prescribed speed. More specifically, the control command value is generated in such a manner as to temporarily indicate a larger value than the control command value C2 to correspond to the change in external force, and then converge on the control command value C2.

In the example shown in FIG. 6, the second part is fixed at the time of being mounted onto the vehicle 100, by being fitted into or onto an undepicted fitting part formed beforehand on the vehicle 100. Accordingly, after time T6, no impact is applied to the vehicle 100 by the fixing tool TL, and the external force and the control command value do not change.

Next, a description is given with reference to FIG. 7. In FIG. 7, horizontal axes represent time, and vertical axes represent vehicle total weight WT, external force acting on the vehicle 100, trailer speed, and control command value, respectively. In the example shown in FIG. 7, the external force acting on the vehicle 100 and the control command value are shown as in FIG. 6.

At time T7, the vehicle total weight WT, the magnitude of external force, and the control command value are a vehicle total weight WT3, an external force FR3, and a control command value C3, respectively. Here, the external force FR3 is a gravity attracting the vehicle 100 having the vehicle total weight WT3, and the control command value C3 refers to a control command value indicating a driving force for causing the vehicle 100 on which the external force FR3 acts to travel at the prescribed speed. The trailer speed is zero, and the trailer 400 is at a stop.

At time T8, the trailer 400 is coupled to the vehicle 100. With the addition of the weight of the trailer 400, the vehicle total weight WT increases from the vehicle total weight WT3 to a vehicle total weight WT4. After the trailer 400 is coupled to the vehicle 100, the trailer 400 is towed by the vehicle 100 at a trailer speed V1. At the time, friction force and inertial force acting when the trailer 400 is towed acts on the vehicle 100, and such a state can be regarded as similar to a state in which the weight of the trailer 400 is added to that of the vehicle 100. The external force increases from the external force FR3 to an external force FR4. The external force FR4 is the sum of the external force FR3 and kinetic friction force acting on the trailer 400 towed at the trailer speed V1. After the trailer 400 and the vehicle 100 are coupled together and before the stationary trailer 400 starts to move, since a larger static friction force than the kinetic friction force acts on the vehicle 100 towing the trailer 400, the external force temporarily becomes larger than the external force FR4. When force with which the vehicle 100 tows the trailer 400 exceeds the static friction force, the trailer 400 starts to dependently move, the kinetic friction force acts, and the external force converges on the external force FR4. The control command value is generated in such a manner as to increase from the control command value C3 to a control command value C4. The control command value C4 refers to a control command value indicating a driving force for causing the vehicle 100 on which the external force FR4 acts to travel at the prescribed speed. More specifically, the control command value is generated in such a manner as to temporarily indicate a larger value than the control command value C4 to correspond to the change in external force, and then converge on the control command value C4.

After time T8, the vehicle total weight WT, the external force acting on the vehicle 100, the trailer speed, and the control command value do not change until the coupling between the trailer 400 and the vehicle 100 is released at time T9. At time T9, when the coupling between the trailer 400 and the vehicle 100 is released, the vehicle total weight WT decreases from the vehicle total weight WT4 to the vehicle total weight WT3 again. The external force decreases from the external force FR4 to the external force FR3 again as a result of the kinetic friction force attributable to the towing of the trailer 400 being lost. The control command value is generated in such a manner as to decrease from the control command value C4 to the control command value C3 again to correspond to the change in external force.

After time T9, the vehicle total weight WT, the external force acting on the vehicle 100, and the control command value do not change. After the coupling between the vehicle 100 and the trailer 400 is released, the trailer speed decreases, with braking force being loaded by the drive control section 512, which will be described later. At time T10, the trailer speed becomes zero, and the trailer 400 comes to a stop. Note that the trailer 400 may decelerate or stop only with kinetic friction force, without braking force being loaded by the drive control section 512. Here, the description of the examples of the generation, by the vehicle control command section 312, of such a control command as to restrain a change in speed is ended.

Note that in FIGS. 6 and 7, there are some cases where the vehicle total weight, the external force, the trailer speed, and the control command value do not perfectly coincide with each other on the time axes, and the control command value delays, except for an embodiment in which vehicle state information and control commands are kept in association with each other. Such a delay is due to a time period or the like required to calculate the control command value. However, such delays are not depicted in FIGS. 6 and 7.

As can be understood from the description using FIGS. 6 and 7, "generate a control command by using the vehicle state information SJ in such a manner as to restrain a change in speed of the vehicle 100 . . . ", which is mentioned above, specifically includes following processes (a) to (c).

(a) The information acquisition section 316 acquires "vehicle state information SJ".

(b) The vehicle control command section 312 calculates, from the vehicle state information, an acceleration rate (not limited to those in forward and rearward directions) that is applied to the vehicle 100.

(c) A control command value of the actuator of the drive device 132 or the steering device 136 of the vehicle 100 is calculated in such a manner as to restrain a change in at least one of the speed and the traveling direction of the vehicle 100 due to the calculated acceleration rate.

Figure 8:
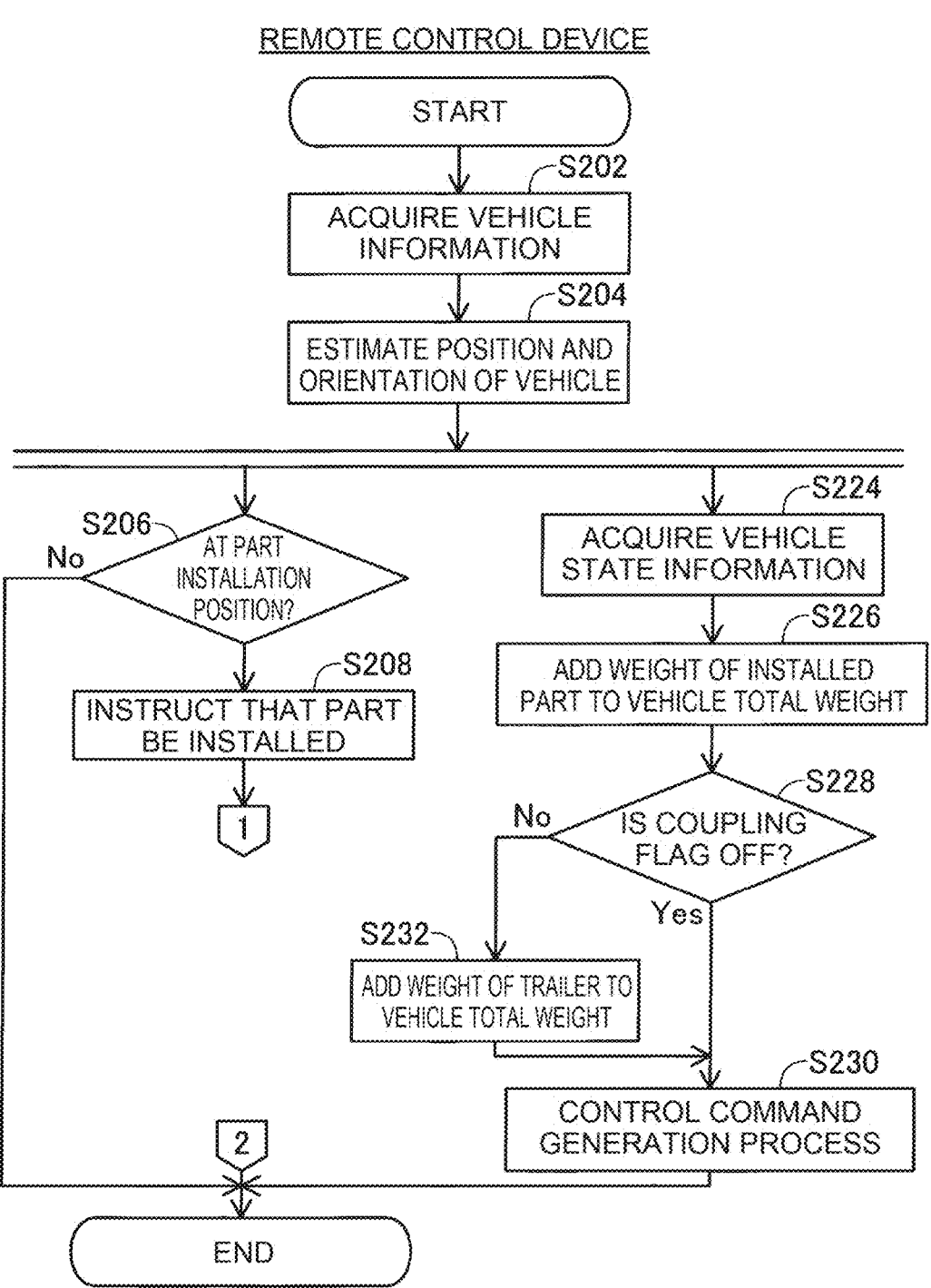
FIG. 8 is a flowchart showing a procedure for a vehicle control method implemented by the remote control device in the first embodiment.

A-2. Method of Control of Vehicle 100 Implemented by Remote Control Device 300:

FIGS. 8 and 9 are flowcharts showing a procedure for a method of control of the vehicle 100 implemented by the remote control device 300 in the first embodiment. The remote control device 300 starts the control shown in FIGS. 8 and 9 each time vehicle information is transmitted from a vehicle detector 80.

In step S202 shown in FIG. 8, the position estimation section 314 acquires vehicle information transmitted from a vehicle detector 80.

In step S204, the position estimation section 314 estimates a position and an orientation of the vehicle 100 by using the vehicle information as described above.

After step S204, control from step S206 to step S222 shown in FIG. 9 and control from step S224 to step S232 shown in FIG. 8 are performed in parallel. Note that step S206 and step S208 may be independent of control from step S210 to step S222 shown in FIG. 9 and may be performed in parallel therewith.

In step S206 shown in FIG. 8, the robot control command section 320 determines whether or not the estimated position of the vehicle 100 is a part installation position. The term "part installation position" refers to a position preset as a position where installation of a part PT to the vehicle 100 by the installation robot RB is performed in the manufacture process. When it is determined that the position of the vehicle 100 is not a part installation position (step S206: No), the remote control device 300 terminates the control.

When it is determined that the position of the vehicle 100 is a part installation position (step S206: Yes), the robot control command section 320 transmits, to the installation robot RB, a control command instructing that the part PT be attached to the vehicle 100. The installation robot RB that has received the control command attaches the part PT to the vehicle 100, according to the control command. The control command transmitted in the present step may be a control signal that specifically indicates an amount of movement of each portion included in the installation robot RB, or may only instruct the installation robot RB to start control for the installation of the part PT. The installation robot RB instructed to start the control for the installation may identify a position on the vehicle 100 where the part PT is attached, by using an own camera or the like, and may implement the attachment of the part PT by autonomous control.

In FIG. 9, a flow on the left shows control that is performed by the remote control device 300, and a flow on the right shows control that is performed by the trailer control device 500. In step S210, the robot control command section 320 determines whether or not a coupling flag JF stored in the storage device 330 is in "OFF" state. The "coupling flag JF" is overwritten through control, which will be described later, in such a manner as to be in "ON" state when the vehicle 100 and the trailer 400 are in the coupled state, and to be in "OFF" state when the vehicle 100 and the trailer 400 are in the non-coupled state.

When it is determined that the coupling flag JF is in "OFF" state (step S210: Yes), in step S212, the trailer control command section 318 determines whether or not the position of the vehicle 100 estimated in step S204 is a coupling starting position. The term "coupling starting position" refers to a position preset as a position where coupling of the trailer 400 to the vehicle 100 is started. More specifically, the coupling starting position is set as a position to start a coupled-state process that is preset as a process to be executed in the coupled state and in which attachment of a part carried by the trailer 400 is performed. When it is determined that the position of the vehicle 100 is not the coupling starting position (step S212: No), the remote control device 300 terminates the control.

When it is determined that the position of the vehicle 100 is the coupling starting position (step S212: Yes), in step S214, the trailer control command section 318 transmits, to the trailer control device 500, a coupling notice instructing that the coupled state be started. Control by the trailer control device 500 that has received the coupling notice will be described later.

In step S216, the trailer control command section 318 overwrites the state of the coupling flag JF recorded in the storage device 330 from "OFF" state to "ON" state. Thereafter, the remote control device 300 terminates the control.

Referring back to step S210, when it is determined that the coupling flag JF is not in "OFF" state (step S210: No), in other words, when the coupling flag JF is in "ON" state, in step S218, the trailer control command section 318 determines whether or not the position of the vehicle 100 estimated in step S204 is a coupling releasing position. The term "coupling releasing position" refers to a position preset as a position where the coupling of the vehicle 100 to the trailer 400 is released. More specifically, the coupling releasing position is set as a position where the coupled-state process is completed. In other words, in step S218, the trailer control command section 318 determines whether or not the vehicle 100 has completed the coupled-state process in the manufacture process. The trailer control command section 318 corresponds to "determination section" in the present disclosure. When it is determined that the position of the vehicle 100 is not the coupling releasing position (step S218: No), the remote control device 300 terminates the control.

When it is determined that the position of the vehicle 100 is the coupling releasing position (step S218: Yes), in step S220, the trailer control command section 318 transmits, to the trailer control device 500, a coupling releasing notice instructing that the coupled state be released. The trailer control command section 318 corresponds to "notice output section" in the present disclosure. Control by the trailer control device 500 that has received the coupling releasing notice will be described later.

In step S222, the trailer control command section 318 overwrites the state of the coupling flag JF recorded in the storage device 330 from "ON" state to "OFF" state. Thereafter, the remote control device 300 terminates the control.

The control by the trailer control device 500 is described. In step S302, the process information acquisition section 516 determines whether or not a coupling notice is received from the remote control device 300. When it is determined that a coupling notice is not received (step S302: No), the coupling control section 514 executes step S306, which will be described later.

When it is determined that a coupling notice is received (step S302: Yes), in step S304, the drive control section 512 and the coupling control section 514 performs coupling control. In the present embodiment, the drive control section 512 and the coupling control section 514 are configured to be triggered by reception of a coupling notice, to perform the preset coupling control. Before the coupling notice is received, the trailer 400 stands by at a predetermined standby position. When the coupling notice is received, the drive control section 512 drives the wheels 432 to approach the vehicle 100, and when the relative positions of the vehicle 100 and the trailer 400 fall in a predetermined positional relation, the coupling control section 514 controls the coupling part 434 and connects the coupling part 434 to a predetermined position on the vehicle 100. After the trailer 400 and the vehicle 100 are coupled together, the drive control section 512 stops driving the wheels 432 through the actuator, and the wheels 432 dependently move by being towed by the vehicle 100. In the present embodiment, since the drive control section 512 stops driving the wheels 432 through the actuator after the trailer 400 and the vehicle 100 are coupled, it is possible to restrain an increase in electric power consumption due to driving of the wheels 432. Note that the coupling control does not need to be preset. A control signal indicating specific actions of the trailer 400 may be generated and output by the trailer control command section 318, and the control by the drive control section 512 and the coupling control section 514 may be performed according to the received control signal, whereby the coupling control may be implemented.

In step S306, the coupling control section 514 determines whether or not a coupling releasing notice is received from the remote control device 300. When it is determined that a coupling releasing notice is not received (step S306: No), the trailer control device 500 executes step S302 again.

When it is determined that a coupling releasing notice is received (step S306: Yes), in step S308, the coupling control section 514 performs coupling releasing control. In the present embodiment, the coupling control section 514 is triggered by reception of a coupling releasing notice, to release the coupled state by controlling the coupling part 434 and bring about the non-coupled state.

In step S310, when it is detected by the coupling detection section 422 that the coupled state is released and the non-coupled state is brought about, the drive control section 512 increases braking force by controlling the braking device 134 and decelerates the trailer 400. Further, the drive control section 512 drives the wheels 432 and causes the trailer 400 to move to the standby position located at a prior process, in the manufacture process, to the coupling releasing position where the trailer 400 is positioned. Since the drive control section 512 decelerates the trailer 400 by increasing braking force when it is detected by the coupling detection section 422 that the coupling part 434 becomes in the non-coupled state, it is possible to cause the trailer 400 to immediately leave the vicinity of the vehicle 100, and it is thus possible to restrain the trailer 400 from obstructing the transport of the vehicle 100. Since the drive control section 512 causes the trailer 400 to move to the standby position located at the prior process in the manufacture process, it is possible to cause the trailer 400 to accompany another vehicle 100 transported from a prior process. Thereafter, the trailer control device 500 executes step S302 again. The vehicle control system 600 including the trailer 400 and the remote control device 300 including the trailer control command section 318 that implements the control of the trailer 400 as described above corresponds to "trailer control system" in the present disclosure.

In step S224 shown in FIG. 8, in parallel with the control from step S206 to step S222, the information acquisition section 316 acquires the vehicle state information SJ from the storage device 330.

In step S226, the information acquisition section 316 refers to the vehicle state information SJ and adds, to the vehicle total weight WT, the weight of a part PT installed in a process located prior to the position of the vehicle 100 estimated in step S204.

In step S228, the information acquisition section 316 determines whether or not the coupling flag JF recorded in the storage device 330 is in "OFF" state. When it is determined that the coupling flag JF is not in "OFF" state (step S228: No), in other words, when the coupling flag JF is in "ON" state, in step S232, the information acquisition section 316 adds the weight of the trailer 400 to the vehicle total weight WT. The reason is that in a state where the trailer 400 is coupled to the vehicle 100, friction force and inertial force acting when the trailer 400 is towed act on the vehicle 100, and such a state can be regarded as similar to a state where the weight of the trailer 400 is added to that of the vehicle 100. When it is determined that the coupling flag JF is in "OFF" state (step S228: Yes), step S232 is not executed.

In step S230, as a control command generation process, the vehicle control command section 312 generates a control command by using the vehicle state information SJ as described above and transmits the control command to the vehicle 100. Thereafter, the remote control device 300 terminates the control.

According to the vehicle control system 600 including the remote control device 300 in the first embodiment as described above, the vehicle control command section 312 is included that generates and outputs a control command to cause the vehicle 100 to move, and the vehicle control command section 312 generates the control command by using the vehicle state information SJ. Accordingly, it is possible to restrain a deviation, in control of the movement of the vehicle 100 by driverless driving, that can be caused by at least one of the magnitude of impact force applied to the vehicle 100, the direction in which the impact force acts, the weight of the vehicle 100, the weight of the trailer 400, and the process in which the vehicle 100 is positioned.

Moreover, the control command is generated by using the vehicle state information SJ in such a manner as to restrain a change in speed of the vehicle 100 that changes due to at least one of impact force, attachment of a part PT to the vehicle 100, coupling of the trailer 400 to the vehicle 100, and release of the coupling between the trailer 400 and the vehicle 100. Accordingly, it is possible to restrain a change in speed of the vehicle 100 that changes due to at least one of impact force, attachment of a part PT to the vehicle 100, coupling of the trailer 400 to the vehicle 100, and release of the coupling between the trailer 400 and the vehicle 100.

Occurrence of the impact force stems from at least one of force acting when a part PT comes into contact with the vehicle 100, force acting when the part PT is fixed to the vehicle 100, and force acting when the trailer 400 is coupled to the vehicle 100. Accordingly, it is possible to restrain a deviation, in control of the movement of the vehicle 100 by driverless driving, that can be caused by at least one of the force acting when a part PT comes into contact with the vehicle 100, the force acting when the part PT is fixed to the vehicle 100, and the force acting when the trailer 400 is coupled to the vehicle 100.

B. Second Embodiment

A remote control device 300 in a second embodiment is different from the remote control device 300 in the first embodiment in the point of generating a control command by using the vehicle state information SJ in such a manner as to restrain a change in traveling direction of the vehicle 100, in addition to generating the control command in such a manner as to restrain a change in speed of the vehicle 100. Since a device configuration of the remote control device 300 in the second embodiment and procedures in other control implemented by the remote control device 300 are similar to those in the first embodiment, the same components and the same procedures are denoted by the same reference signs as in the first embodiment, and a detailed description thereof is omitted.

In the second embodiment, for the vehicle state information SJ, the vehicle control command section 312 uses an attachment position on the vehicle 100 where a part PT is attached, and a coupling position on the vehicle 100 where the trailer 400 is coupled, in addition to each element used in the first embodiment. By using the attachment position of the part PT on the vehicle 100 and the coupling position of the trailer 400 on the vehicle 100, the vehicle control command section 312 generates the control command in such a manner as to restrain a change in traveling direction of the vehicle 100 that changes according to the attachment position of the part PT and the coupling position of the trailer 400. In the present embodiment, an attachment position of a part PT in each process and the coupling position of the trailer 400 are stored beforehand as vehicle state information SJ in the storage device 330.

Figure 10:
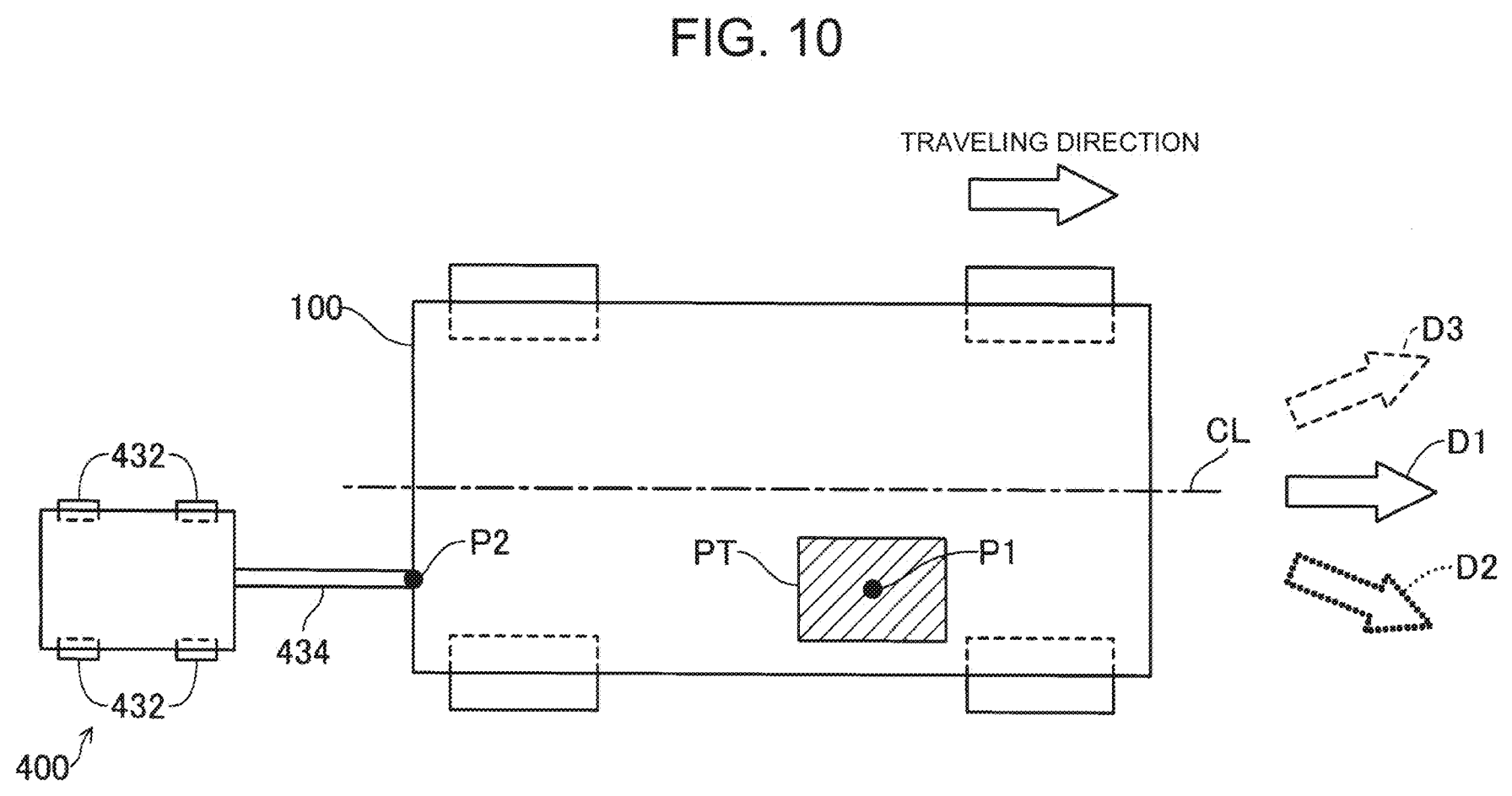

FIG. 10 is a top view of the vehicle 100. With reference to FIG. 10, the generation of such a control command as to restrain a change in traveling direction of the vehicle 100 is described. In the description below, to refer to "to the right in the traveling direction" and "to the left in the traveling direction", simply "to the right" and "to the left" are also used, respectively. As shown in FIG. 10, the part PT is attached at the attachment position P1 that is out of a central axis CL of the vehicle 100 to the right. The trailer 400 is coupled via the coupling part 434 at the coupling position P2 that is out of the central axis CL of the vehicle 100 to the right. In such a case, force that decelerates the vehicle 100, such as the weight of the part PT and friction force attributable to towing of the trailer 400, acts on the vehicle 100 off-center to the right. As a result of the decelerating force acting off-center toward the right, the vehicle 100 travels in a deflecting direction D2 that is a direction having changed to the right from a target direction D1 predetermined as a traveling direction. The vehicle 100 also travels in the deflecting direction D2 when impact force acts to the right on the vehicle 100. In further another example, when the coupling between the vehicle 100 and the trailer 400 is released in a state where the vehicle 100 travels in the target direction D1 even though the trailer 400 is coupled at the coupling position P2, the decelerating force acting at the coupling position P2, which is out of the central axis CL of the vehicle 100 to the right, is lost, so that the vehicle 100 travels to the left. In other words, the traveling direction of the vehicle 100 changes due to at least one of impact force acting on the vehicle 100, attachment of the part PT to the vehicle 100, coupling of the trailer 400 to the vehicle 100, and release of the coupling between the trailer 400 and the vehicle 100. If such a change in traveling direction becomes large, a problem may arise that the difference between the position of the vehicle 100 and a target route becomes so large that attachment of a part to the vehicle 100 is hindered.

To solve such a problem, in the present embodiment, the vehicle control command section 312 generates the control command in such a manner as to cause the vehicle 100 to head to the left in the traveling direction with respect to the target direction D1, that is, in a corrective direction D3 that is the mirror-inverted direction of the deflecting direction D2 with respect to the target direction D1. More specifically, the vehicle control command section 312 generates a control command value indicating a steering angle or a turning angle to head in the corrective direction D3 and outputs the control command value as the control command to the vehicle 100. When the vehicle 100 is configured to be able to drive left and right wheels by using mutually different drive torques, the vehicle control command section 312 may generate a control command value of driving force in such a manner as to make the torque for the right-side wheel, on which a larger decelerating force acts than on the left-side wheel, larger than the torque for the left-side wheel, and may transmit the control command value of driving force as the control command to the vehicle 100. By generating the control command as described above, force to head in the deflecting direction D2 and force to head in the corrective direction D3 can be canceled out, and it is thus possible to cause the vehicle 100 to travel in the target direction D1.

Note that the generation of the control command as described above is performed, as in the first embodiment, at timings of mounting the part PT onto the vehicle 100, fixing the part PT to the vehicle 100, starting to couple the trailer 400 to the vehicle 100, and releasing the coupling between the trailer 400 and the vehicle 100.

According to the remote control device 300 in the second embodiment as described above, a control command is generated by using the vehicle state information SJ in such a manner as to restrain a change in traveling direction of the vehicle 100 that changes due to at least one of impact force, attachment of a part PT to the vehicle 100, coupling of the trailer 400 to the vehicle 100, and release of the coupling between the trailer 400 and the vehicle 100. Accordingly, it is possible to restrain a change in traveling direction of the vehicle 100 that changes due to at least one of impact force, attachment of a part PT to the vehicle 100, coupling of the trailer 400 to the vehicle 100, and release of the coupling between the trailer 400 and the vehicle 100.

C. Third Embodiment

A remote control device 300 in a third embodiment is different from the remote control device 300 in the first embodiment in the point of performing control of decreasing the traveling speed of the vehicle 100, depending on the vehicle total weight WT. Since a device configuration of the remote control device 300 in the third embodiment and procedures in other control implemented by the remote control device 300 are similar to those in the first embodiment, the same components and the same procedures are denoted by the same reference signs as in the first embodiment, and a detailed description thereof is omitted.

When the weight of the vehicle 100 increases, a longer time period is required to decelerate the vehicle 100 to a desired speed and a longer braking distance results if the same braking force as before the weight increases is used to decelerate the vehicle 100. In such a case, at a time of attaching a part PT to the vehicle 100 or the like, a problem can arise that the attachment of the part PT cannot be appropriately performed due to the fact that the speed of the vehicle 100 at a time point of arrival at a part installation position exceeds a predetermined speed, or the fact that the timing of arrival of the vehicle 100 at the part installation position is misaligned. Moreover, due to the longer braking distance, the vehicle 100 overshooting a predetermined position may touch an obstacle and sustain damage, and cycle time may increase for repair. To solve such problems, in the present embodiment, the vehicle control command section 312 uses information related to the weight of the vehicle 100 (hereinafter, also referred to as "weight-related information") for vehicle state information SJ, and, when the weight of the vehicle 100 increases, generates a control command in such a manner as to decrease the speed of the vehicle 100 compared to that before the weight of the vehicle 100 increases.

Figure 11:
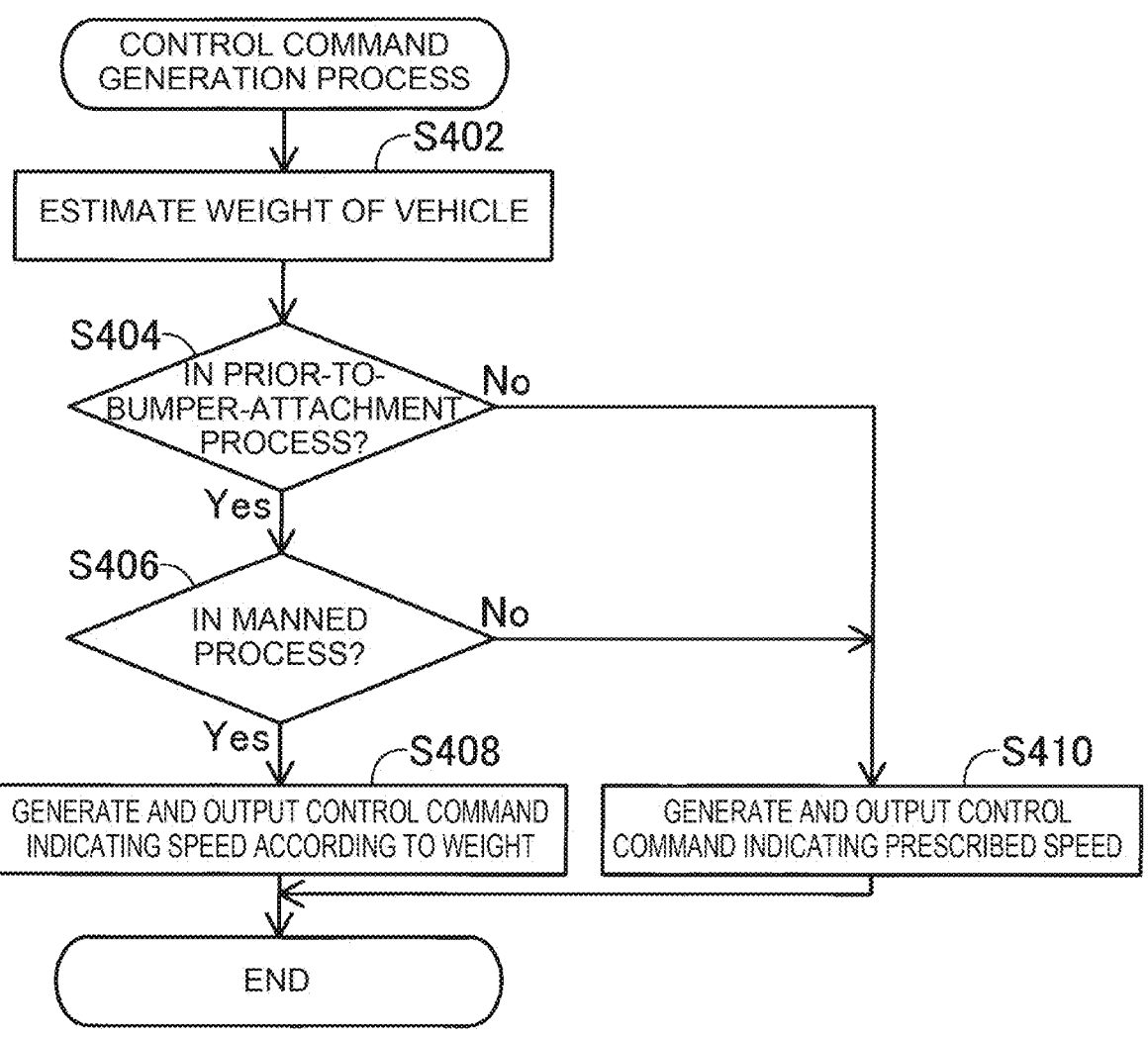
FIG. 11 is a flowchart showing a procedure for a control command generation process executed by a remote control device in a third embodiment.

FIG. 11 is a flowchart showing a procedure for a control command generation process executed by the remote control device 300 in the present embodiment. In step S402, the information acquisition section 316 estimates a weight of the vehicle 100. In the present embodiment, vehicle total weights WT are mutually associated with positions of the vehicle 100 and stored beforehand as vehicle state information SJ in the storage device 330. The vehicle state information SJ in the present embodiment corresponds to "position-weight correspondence information" in the present disclosure. The storage device 330 corresponds to "information keeping section". By using a position of the vehicle 100 estimated by the position estimation section 314 and the vehicle state information SJ as the position-weight correspondence information, the information acquisition section 316 identifies a vehicle total weight WT at the position of the vehicle 100, in other words, estimates a weight of the vehicle 100. The information acquisition section 316 in the present embodiment corresponds to "weight estimation section" in the present disclosure.

In step S404, the vehicle control command section 312 determines whether or not the vehicle 100 is positioned in a prior-to-bumper-attachment process. The term "prior-to-bumper-attachment process" refers to a process prior to a bumper attachment process in which a bumper is attached to an outer side of the vehicle 100. When it is determined that the vehicle 100 is positioned in the prior-to-bumper-attachment process (step S404: Yes), in step S406, the vehicle control command section 312 determines whether or not the vehicle 100 is positioned in a manned process. The term "manned process" refers to a process in which a worker is present.

When it is determined that the vehicle 100 is positioned in a manned process (step S406: Yes), in step S408, the vehicle control command section 312 generates a control command indicating a speed according to the weight of the vehicle 100 and transmits the control command to the vehicle 100. The vehicle control command section 312 generates the control command in such a manner as to decrease the speed of the vehicle 100, according to the weight of the vehicle 100, compared to that before the weight of the vehicle 100 increases. Thereafter, the remote control device 300 terminates the present process.

When it is determined that the vehicle 100 is not positioned in the prior-to-bumper-attachment process (step S404: No), that is, when the vehicle 100 is positioned in a subsequent-to-bumper-attachment process that is a process subsequent to the bumper attachment process, or when it is determined that the vehicle 100 is positioned in a process that is not a manned process (step S406: No), that is, when the vehicle 100 is positioned in an unmanned process in which a worker is not present, in step S410, the vehicle control command section 312 generates a control command indicating a prescribed speed, regardless of the weight of the vehicle 100, and outputs the control command to the vehicle 100. In other words, in such a case, even if the weight of the vehicle 100 increases, such a command as to decrease the speed of the vehicle 100, compared to that before the weight of the vehicle 100 increases, is not generated. A reason is that after the bumper attachment process, even if the speed of the vehicle 100 is not decreased, the degree of damage to the vehicle 100 can be mitigated, compared to that in a state where a bumper is not attached, when the vehicle 100 touches an obstacle due to an increase in weight of the vehicle 100, so that time required for repair can be shortened, and an increase in cycle time can be restrained. Another reason is that in the unmanned process, it is not necessary to limit the speed in consideration for the working speed of a worker. Still another reason is that with the bumper attached, it becomes easier for a worker to recognize the vehicle 100.

According to the remote control device 300 in the third embodiment as described above, acquired weight-related information is used, and when the weight of the vehicle 100 increases, a control command is generated in such a manner as to decrease the speed of the vehicle 100, compared to that before the weight of the vehicle 100 increases. Accordingly, it is possible to reduce the braking distance of the vehicle 100 that increases according to the weight of the vehicle 100.

Moreover, the weight estimation section is further included that estimates a weight of the vehicle 100 by using the weight-related information. The vehicle control command section 312 uses the estimated weight of the vehicle 100 and, when the weight of the vehicle 100 increases, generates the control command in such a manner as to decrease the speed of the vehicle 100, compared to that before the weight of the vehicle 100 increases. Accordingly, such a control command as to reduce the speed of the vehicle 100 can also be generated by using the estimated weight of the vehicle 100.

Furthermore, the information keeping section is further included that keeps position-weight correspondence information. The information acquisition section 316 acquires the position of the vehicle 100 as weight-related information, and the weight estimation section estimates, by using the position-weight correspondence information and the acquired position of the vehicle 100, a weight of the vehicle 100 at the position of the vehicle 100. Accordingly, a weight of the vehicle 100 can be easily estimated by using the position of the vehicle 100.

When the vehicle 100 is positioned in a subsequent-to-bumper-attachment process that is a process subsequent to the bumper attachment process, and when the weight of the vehicle 100 increases compared to the weight of the vehicle 100 in a process prior to the subsequent-to-bumper-attachment process, such a control command as to decrease the speed of the vehicle 100, compared to that before the weight of the vehicle 100 increases, is not generated. Accordingly, it is possible to restrain time required to transport the vehicle 100 from increasing.

When the vehicle 100 is positioned in an unmanned process in which a worker is not present in the manufacture process, and when the weight of the vehicle 100 increases compared to the weight of the vehicle 100 in a process prior to the unmanned process, such a control command as to decrease the speed of the vehicle 100, compared to that before the weight of the vehicle 100 increases, is not generated. Accordingly, it is possible to restrain time required to transport the vehicle 100 from increasing.

D. Fourth Embodiment

A remote control device 300 in a fourth embodiment is different from the remote control device 300 in the third embodiment in the point of estimating a weight of the vehicle 100 by using, for weight-related information, displacement information indicating a displacement of an undepicted suspension device included in the vehicle 100, in place of the vehicle total weight WT. Since a device configuration of the remote control device 300 in the fourth embodiment and procedures in other control implemented by the remote control device 300 are similar to those in the third embodiment, the same components and the same procedures are denoted by the same reference signs as in the third embodiment, and a detailed description thereof is omitted.

In step S402 shown in FIG. 11, in the present embodiment, the information acquisition section 316 estimates a weight of the vehicle 100 by using, for weight-related information, displacement information indicating a displacement of the undepicted suspension device that supports the wheels included in the vehicle 100. The displacement information is acquired by an undepicted sensor installed beforehand in the vehicle 100 or outside of the vehicle 100, and is output to the information acquisition section 316. The information acquisition section 316 can estimate a weight of the vehicle 100 at each time point by using the displacement information. For example, a relation between displacement information and each weight of the vehicle 100 is identified beforehand by experiment, simulation, or the like and stored as a table in the storage device 330.

According to the remote control device 300 in the fourth embodiment as described above, displacement information indicating a displacement of the suspension device is acquired as weight-related information, and a weight of the vehicle 100 is estimated by using the displacement information. Accordingly, a weight of the vehicle 100 can be estimated with more accuracy, based on the displacement information that changes according to the actual weight of the vehicle 100.

E. Fifth Embodiment

Figure 12:
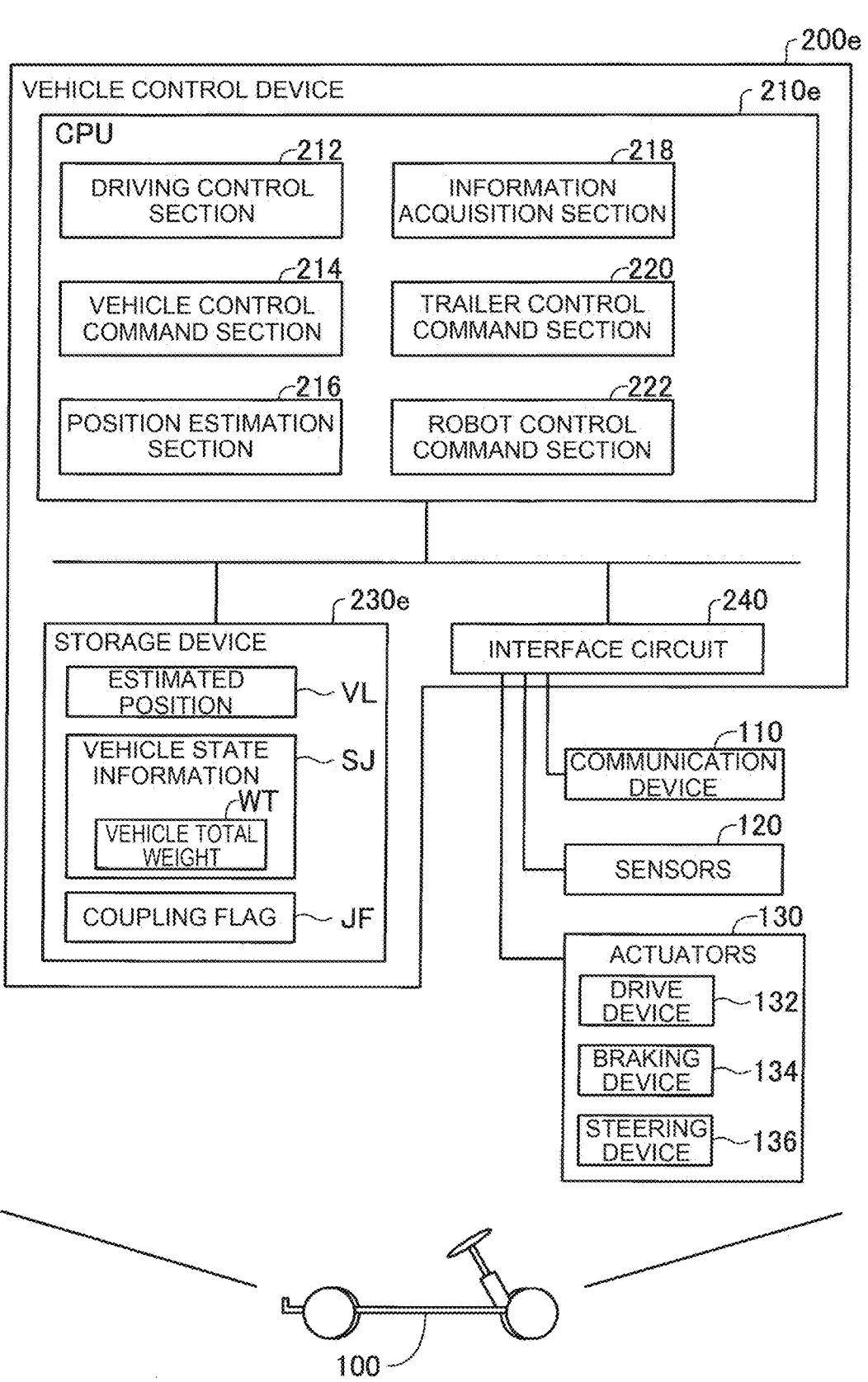
FIG. 12 is a block diagram showing a schematic configuration of a vehicle control device included in a vehicle in a fifth embodiment.

FIG. 12 is a block diagram showing a schematic configuration of a vehicle control device 200e included in a vehicle 100 in a fifth embodiment. In the present embodiment, a vehicle control system 600 is different from the vehicle control system 600 in the first embodiment in the point of not including the remote control device 300. Specifically, the difference from the first embodiment is that in place of the remote control device 300, the vehicle control device 200e installed in the vehicle 100 includes functionality as a control device in the present disclosure. Other components of the vehicle control system 600 are similar to those in the first embodiment unless a description is particularly given.

As shown in FIG. 12, the vehicle control device 200e is different from the vehicle control device 200 shown in the first embodiment in the points of including a CPU 210e in place of the CPU 210, and including a storage device 230e in place of the storage device 230. Specifically, the storage device 230e stores a program for further implementing functions corresponding to the vehicle control command section 312, the position estimation section 314, the information acquisition section 316, the trailer control command section 318, and the robot control command section 320 included in the remote control device 300, in addition to the functions of the CPU 210 shown in the first embodiment. As a result, the CPU 210e further functions as a vehicle control command section 214, a position estimation section 216, an information acquisition section 218, a trailer control command section 220, and a robot control command section 222 corresponding to the additional functions. Moreover, the storage device 230e stores the estimated position VL, the vehicle state information SJ, and the coupling flag JF stored in the remote control device 300. According to the thus configured vehicle 100, advantageous effects similar to those of the first embodiment can be obtained without using a device, such as the remote control device 300, that is a separate entity from the vehicle 100.

Figure 13:
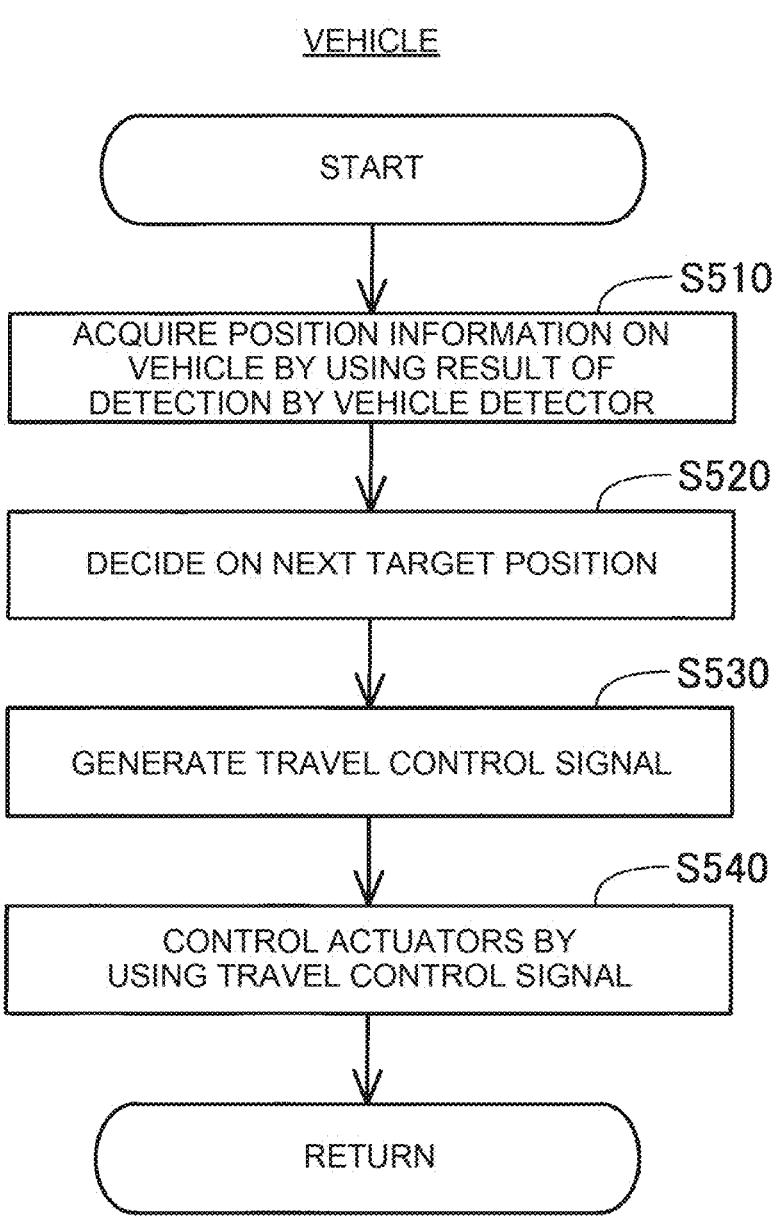
FIG. 13 is a flowchart showing a method for driving the vehicle in the fifth embodiment.

FIG. 13 is a flowchart showing a method for driving the vehicle 100 in the present embodiment. In step S510, the position estimation section 216 acquires the position and orientation of the vehicle 100 by using a result of detection by a vehicle detector 80. In step S520, the vehicle control command section 214 decides on a target position for the vehicle 100 to head for next. In the present embodiment, an ideal path is stored beforehand in the storage device 230e of the vehicle control device 200e. In step S530, the vehicle control command section 214 generates a travel control signal for causing the vehicle 100 to travel toward the decided target position. In step S540, the driving control section 212 controls the actuators 140 by using the generated travel control signal and thereby causes the vehicle 100 to travel at an acceleration rate and a steering angle indicated by the travel control signal. The driving control section 212 repeats the cycle of acquiring the position and orientation of the vehicle 100, deciding on a target position, generating a travel control signal, and controlling the actuators 140, in each predetermined period. According to the vehicle 100 in the present embodiment, it is possible to cause the vehicle 100 to travel by autonomous control, without the vehicle 100 being remotely controlled by the remote control device 300.

F. Other Embodiments

F1

Although a part PT is fixed by using the fixing tool TL held by a worker in the embodiments, the present disclosure is not limited thereto. A part PT may be fixed by using the fixing tool TL mounted on the installation robot RB.

Although the fixing tool TL is configured as an impact wrench in the embodiments, the present disclosure is not limited thereto. The fixing tool TL is not limited to a fastening tool such as an impact wrench, and may be a tool that implements an arbitrary fixing method involving contact with a part PT mounted on the vehicle 100 or with the vehicle 100, such as spot welding by which predetermined points of the vehicle 100 and the part PT are held and welded together. Also in such an embodiment, it is possible to restrain changes in speed and traveling direction of the vehicle 100 due to contact of the tool with the part PT or the vehicle, and it is possible to restrain a deviation in control of the movement of the vehicle 100.

F2

Although the remote control device 300 includes the trailer control command section 318 in the embodiments, the present disclosure is not limited thereto. The remote control device 300 does not need to include the trailer control command section 318, and the trailer 400 may be autonomously controlled. For example, the trailer 400 may include a camera that captures an image around the trailer 400 and, when it is recognized that the vehicle 100 arrives at the coupling starting position or the coupling releasing position, may autonomously start coupling to the vehicle 100 or perform release of the coupling. In such an embodiment, the remote control device 300 does not need to transmit a coupling notice or a coupling releasing notice to the trailer 400. Such an embodiment also brings about advantageous effects similar to those of the embodiments. In addition, since neither the coupling notice nor the coupling releasing notice needs to be transmitted to the trailer 400, it is possible to restrain the control by the remote control device 300 from becoming complicated.

F3

Although the information acquisition section 316 acquires the vehicle state information SJ that is stored beforehand from the storage device 330 in the embodiments, the present disclosure is not limited thereto. The information acquisition section 316 may acquire the vehicle state information SJ from an undepicted process management device. The process management device is a device for managing the process of manufacturing vehicles 100. The process management device is configured by using a computer. The process management device acquires information from various equipment in the factory and generates information (hereinafter, also referred to as "process information") related to the process of manufacturing each vehicle 100 that is a product. The process information includes information indicating when, where, and which worker will carry out what work on which product, information indicating when, where, and which worker carried out what work on which product, and information indicating the progress of work. The process management device includes a communication device and transmits the process information to the remote control device 300 through wired communication or wireless communication. Note that the remote control device 300 may include the functionality of the process management device.

The information acquisition section 316 may acquire, as vehicle state information SJ, information acquired by at least one of a sensor included in the vehicle 100 and a sensor installed beforehand outside of the vehicle 100. For example, the type of a part PT to be attached to the vehicle 100 in each process, whether or not attachment of the part PT to the vehicle 100 is completed, a position on the vehicle 100 where the part PT is attached, and whether or not the trailer 400 is coupled to the vehicle 100 may be identified by analyzing an image acquired by a vehicle detector 80. The weight of the vehicle 100, the weight of the trailer 400, and the weight of each part PT may be acquired by a weight sensor installed beforehand on a drive lane where the vehicle 100 travels, or in the vicinity of the drive lane. The weight of each part PT may be acquired by a weight sensor installed beforehand in the installation robot RB when the part PT is held by the installation robot RB. The weight of each part PT may be acquired by a weight sensor installed beforehand in the vehicle 100 when the part PT is mounted on the vehicle 100. Such embodiments bring about similar advantageous effects to those of the embodiments. In addition, the weight of the vehicle 100, the weight of the trailer 400, the weight of each part PT, an attachment position of each part PT on the vehicle 100, a timing of the attachment, and a timing of coupling the trailer 400 to the vehicle 100 can be identified based on the actual state of the vehicle 100. Accordingly, a control command can be generated based on the identified actual weights and timings, and it is thus possible to further restrain a deviation in control of the movement of the vehicle 100 (the mobile object) by driverless driving.

Impact force acting on the vehicle 100 may be acquired by an accelerometer installed beforehand in at least any one of the vehicle 100, the installation robot RB, and the trailer 400. Information acquired by the accelerometer corresponds to "impact force information" in the present disclosure. Such an embodiment brings about similar advantageous effects to those of the embodiments. In addition, a control command can be generated by using an impact force that is actually acting on the vehicle 100, and it is thus possible to restrain a deviation, in control of the movement of the vehicle 100 by driverless driving, that can occur due to impact force, compared to an embodiment in which a control command is generated by using a preset impact force.

A timing of starting to couple the trailer 400 or releasing the coupling thereof may be identified by acquiring coupling release information indicating whether or not the coupled state is released, as a result of detection by the coupling detection section 422. Such an embodiment brings about similar advantageous effects to those of the embodiments. In addition, a control command can be generated based on the actual coupled state, and it is thus possible to restrain a deviation, in control of the movement of the vehicle 100 by driverless driving, that is caused by the coupled state with the trailer 400.

F4

Figure 14:
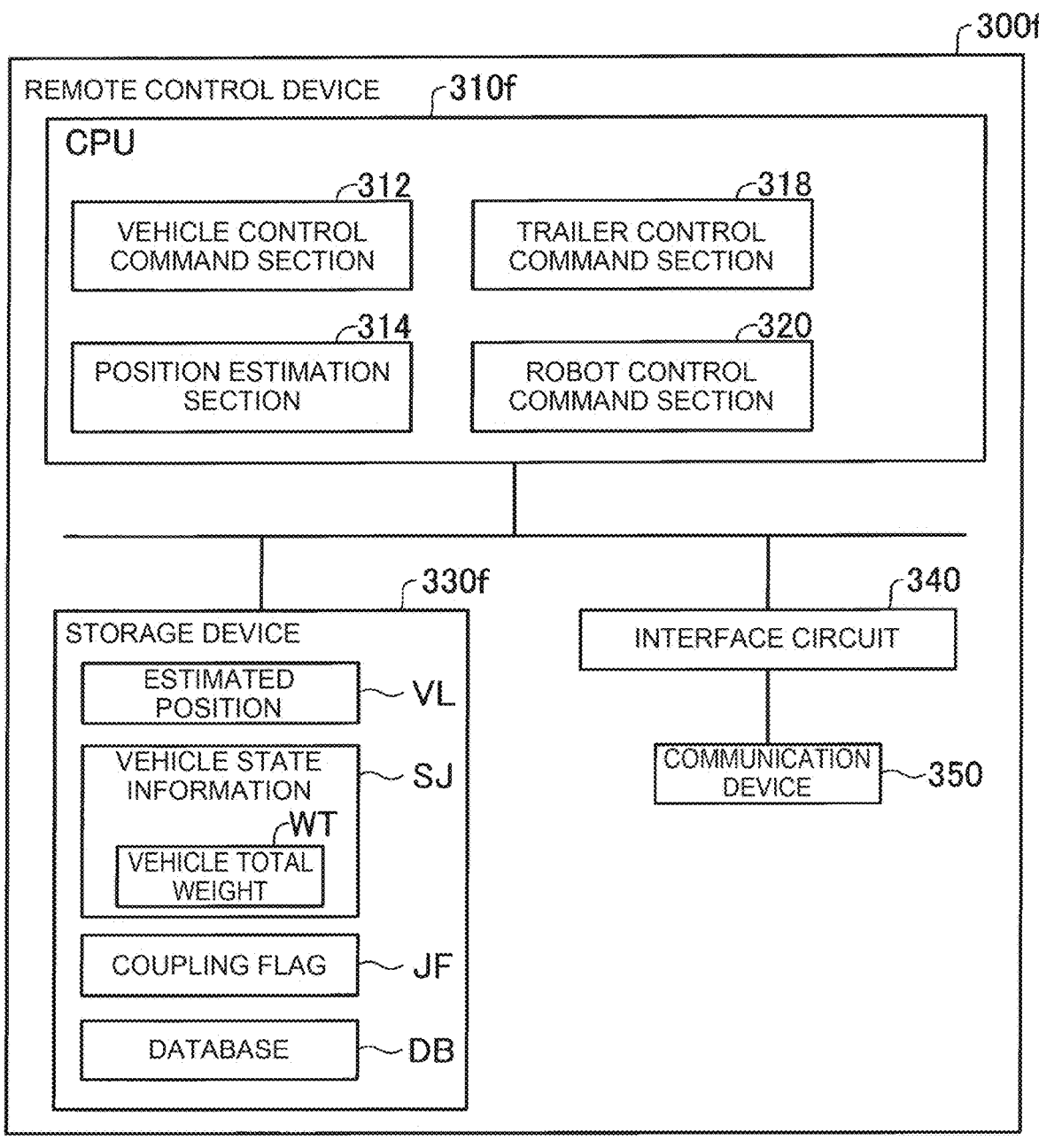
FIG. 14 is a block diagram showing a schematic configuration of a remote control device in another embodiment.

Although the vehicle control command section 312 generates a control command by using the vehicle state information SJ acquired by the information acquisition section 316 in the embodiments, the present disclosure is not limited thereto. FIG. 14 is a block diagram showing a schematic configuration of a remote control device 300f in another embodiment. As shown in FIG. 14, a storage device 330f stores a database DB beforehand. A CPU 310f does not need to include the information acquisition section 316. The "database DB" keeps information related to a control command and information related to a position of the vehicle 100 in association with each other. The "information related to a control command" is a control command specified beforehand, for each position of the vehicle 100, based on vehicle state information SJ corresponding to position information on the vehicle 100, or a correction value to be added, at each position of the vehicle 100, to a control command generated without the vehicle state information SJ taken into consideration.

In such an embodiment, the vehicle control command section 312 refers to the database DB and identifies a control command or a correction value corresponding to an estimated position VL estimated by the position estimation section 314. The vehicle control command section 312 transmits the identified control command, or a control command generated by adding the identified correction value to a control command generated without the vehicle state information SJ taken into consideration, to the vehicle 100. Such an embodiment brings about similar advantageous effects to those of the embodiments. In addition, a control command can be easily generated by using the database DB, and it is thus possible to easily restrain a deviation, in control of the movement of the vehicle 100 by driverless driving, that is caused by at least one of the magnitude of impact force applied to the vehicle 100, the direction in which the impact force acts, the weight of the vehicle 100, the weight of the trailer 400, and the process in which the vehicle 100 is positioned. Note that the remote control device 300f including the storage device 330f storing the database DB and a functional section that controls writing and reading of the database DB in the remote control device 300f may be implemented as a computer program that implements a database management device, a database system, and the database DB. Any one or both of the database management device and the database system may be implemented independently of the remote control device 300. The database management device includes the storage device 330f that stores the database DB and the functional section that controls writing and reading of the database DB in the remote control device 300f.

F5

Although the remote control device 300 generates a control command in such a manner as to restrain a change in traveling direction of the vehicle 100 in addition to generating a control command in such a manner as to restrain a change in speed of the vehicle 100 in the second embodiment, the present disclosure is not limited thereto. The remote control device 300 may perform only the generation of a control command in such a manner as to restrain a change in traveling direction of the vehicle 100.

F6

Although the vehicle control command section 312 transmits a control command generated by using the vehicle state information SJ to the vehicle 100, and the driving control section 212 included in the vehicle 100 causes the vehicle 100 to travel according to the received control command in the embodiments, the present disclosure is not limited thereto. The vehicle control command section 312 may transmit a control command generated without the vehicle state information SJ taken into consideration to the vehicle 100, and the driving control section 212 included in the vehicle 100 may correct the received control command by using the vehicle state information SJ, and may cause the vehicle 100 to travel according to the corrected control command. In such an embodiment, the driving control section 212 may acquire, as the vehicle state information SJ, information acquired by at least one of a sensor included in the vehicle 100 and a sensor installed beforehand outside of the vehicle 100. Such an embodiment also brings about similar advantageous effects to those of the embodiments. F7

Although the remote control device 300 executes steps S404 and S406 in the control command generation process in the third embodiment, the present disclosure is not limited thereto. The remote control device 300 may execute only any one of steps S404 and S406. According to such an embodiment, since executions of a determination process in the control command generation process can be reduced, it is possible to restrain the processes by the remote control device 300 from becoming complicated. In addition, it is possible to restrain time required to transport the vehicle 100 from increasing, compared to an embodiment in which neither step S404 nor step S406 is executed.

The remote control device 300 does not need to execute step S404, step S406, step S410. In other words, after a weight of the vehicle 100 is estimated in step S402, a control command indicating a speed according to the weight of the vehicle 100 may always be generated and output in step S408. According to such an embodiment, when the weight of the vehicle 100 increases, a control command is always generated in such a manner as to decrease the speed of the vehicle 100 compared to that before the weight of the vehicle 100 increases. Accordingly, in any process, it is possible to reduce the braking distance of the vehicle 100 that increases according to the weight of the vehicle 100. F8

Although the vehicle control system 600 includes a camera as a vehicle detector 80 in the embodiments, the present disclosure is not limited thereto. The vehicle control system 600 may include light detection and ranging (LiDAR) as a vehicle detector 80, in place of the camera or in addition to the camera. In such an embodiment, the vehicle detector 80 acquires three-dimensional point cloud data on the vehicle 100, in addition to a video of the vehicle 100. The "three-dimensional point cloud data" is data indicating three-dimensional positions of a point cloud. The vehicle control command section 312 estimates a position and an orientation of the vehicle 100 in the acquired three-dimensional point cloud data. Specifically, the vehicle control command section 312 performs template matching using vehicle point cloud data stored beforehand in the storage device 330, against the three-dimensional point cloud data. Accordingly, a position and an orientation of the vehicle 100 in the three-dimensional point cloud data can be estimated with high accuracy. The estimated position and orientation of the vehicle 100 are stored as estimated position VL in the storage device 330. For the vehicle point cloud data as a template, for example, three-dimensional CAD data on the vehicle 100 can be used. The vehicle point cloud data includes information for identifying the orientation of the vehicle 100. For the template matching of the vehicle point cloud data against the three-dimensional point cloud data, for example, the iterative closest point (ICP) algorithm, the normal distribution transform (NDT) algorithm, or the like can be used. Note that the template matching does not need to be performed, for example, when a position of the vehicle 100 can be estimated with high accuracy from the three-dimensional point cloud data. F9

In each of the embodiments, an example is shown in which the vehicles 100 are passenger cars, motor trucks, buses, construction vehicles, and the like. However, the vehicles 100 are not limited thereto, and may be various mobile objects. A "mobile object" refers to an object that can move, and is, for example, a vehicle or an electric vertical takeoff and landing aircraft (so-called flying car). A vehicle may be a vehicle that travels with wheels or a vehicle that travels with endless track, and examples thereof may include a two-wheel vehicle, a four-wheel vehicle, a tank, and the like. Vehicles are not limited to battery electric vehicles and include a gasoline vehicle, a hybrid electric vehicle, and a fuel cell electric vehicle. When a mobile object is other than a vehicle, expressions "vehicle" and "car" in the present disclosure can be replaced with "mobile object" as appropriate, and an expression "travel" can be replaced with "move" as appropriate. The system that controls the movement of a mobile object as described above corresponds to "mobile object control system" in the present disclosure. F10

The vehicles 100 may be manufactured by an arbitrary manufacturing method. For example, each vehicle 100 may be manufactured by combining a plurality of modules. A module refers to a unit including a plurality of parts that is assembled according to each portion or each function of the vehicle 100. For example, a platform of the vehicle 100 may be manufactured by combining a front module that constitutes a front portion of the platform, a center module that constitutes a central portion of the platform, and a rear module that constitutes a rear portion of the platform. Note that the number of modules included in the platform is not limited to three, and may be two or less, or four or more. Moreover, in addition to, or in place of, the parts included in the platform, parts included in a different portion of the vehicle 100 from the platform may be modularized. Various modules may include arbitrary exterior parts, such as a bumper and a grille, and arbitrary interior parts, such as a seat and a console. Not only the vehicles 100, a mobile object in an arbitrary aspect may be manufactured by combining a plurality of modules. For example, such a module may be manufactured by joining a plurality of parts by welding, with fixing devices, or the like, or may be manufactured by forming at least some of the parts included in the module into one unified part by casting. A casting scheme of forming one unified part, particularly a relatively large part, is also referred to as giga casting or mega casting. For example, the front module, the center module, and the rear module may be manufactured by using giga casting. F11

In the embodiments, an example is shown in which the remote control device 300 executes the processes from acquisition of the position and orientation of the vehicle 100 up to generation of a travel control signal. In contrast, the vehicle 100 may execute at least one or some of the processes from acquisition of the position and orientation of the vehicle 100 up to generation of a travel control signal. For example, embodiments as described in (1) to (3) below may be possible.

(1) The remote control device 300 may acquire the position and orientation of the vehicle 100, may decide on a target position for the vehicle 100 to head for next, and may generate a path from the current position of the vehicle 100 indicated by the acquired position up to the target position. The remote control device 300 may generate the path up to the target position between the current position and a destination, or may generate the path up to the destination. The remote control device 300 may transmit the generated path to the vehicle 100. The vehicle 100 may generate a travel control signal such that the vehicle 100 travels on the path received from the remote control device 300, and may control the actuators 140 by using the generated travel control signal.

(2) The remote control device 300 may acquire the position and orientation of the vehicle 100, and may transmit the acquired position and orientation to the vehicle 100. The vehicle 100 may decide on a target position for the vehicle 100 to head for next, may generate a path from the current position of the vehicle 100 indicated by the received position up to the target position, may generate a travel control signal such that the vehicle 100 travels on the generated path, and may control the actuators 140 by using the generated travel control signal.

(3) In the embodiments described in (1), (2), an internal sensor may be mounted in the vehicle 100, and a result of detection output from the internal sensor may be used in at least one of the generation of a path and the generation of a travel control signal. Examples of the internal sensor can include an imaging device, a LiDAR, a millimeter-wave radar, an ultrasound sensor, a GPS sensor, an accelerometer, a gyroscope sensor, and the like. For example, in the embodiment described in (1), the remote control device 300 may acquire a result of detection by the internal sensor and, when generating a path, may reflect the result of detection by the internal sensor in the path. In the embodiment described in (1), the vehicle 100 may acquire a result of detection by the internal sensor and, when generating a travel control signal, may reflect the result of detection by the internal sensor in the travel control signal. In the embodiment described in (2), the vehicle 100 may acquire a result of detection by the internal sensor and, when generating a path, may reflect the result of detection by the internal sensor in the path. In the embodiment described in (2), the vehicle 100 may acquire a result of detection by the internal sensor and, when generating a travel control signal, may reflect the result of detection by the internal sensor in the travel control signal.

F12

In the embodiments, an internal sensor may be mounted in the vehicle 100, and a result of detection output from the internal sensor may be used in at least one of the generation of a path and the generation of a travel control signal. For example, the vehicle 100 may acquire a result of detection by the internal sensor and, when generating a path, may reflect the result of detection by the internal sensor in the path. The vehicle 100 may acquire a result of detection by the internal sensor and, when generating a travel control signal, may reflect the result of detection by the internal sensor in the travel control signal.

F13

In the embodiments, the vehicle 100 acquires the position and orientation of the vehicle 100 by using a result of detection by a vehicle detector 80. In contrast, an internal sensor may be mounted in the vehicle 100, and the vehicle 100 may acquire the position and orientation of the vehicle 100 by using a result of detection by the internal sensor, may decide on a target position for the vehicle 100 to head for next, may generate a path from the current position of the vehicle 100 indicated by the acquired position and orientation up to the target position, may generate a travel control signal to travel on the generated path, and may control the actuators 140 by using the generated travel control signal. In such a case, the vehicle 100 can travel without using a result of detection by any vehicle detector 80 at all. Note that the vehicle 100 may acquire a target arrival time or congestion information from the outside of the vehicle 100 and may reflect the target arrival time or the congestion information in at least one of the path and the travel control signal.

F14

In the embodiments, the remote control device 300 automatically generates a travel control signal to transmit to the vehicle 100. In contrast, the remote control device 300 may generate a travel control signal to transmit to the vehicle 100, according to an operation by an operator located outside of the vehicle 100. For example, the operator may operate a maneuvering device that includes a display for displaying an image output from a vehicle detector 80, a steering wheel, an accelerator, and a brake pedal for remotely controlling the vehicle 100, and a communication device for communicating with the remote control device 300 through wired communication or wireless communication, and the remote control device 300 may generate a travel control signal according to an operation applied to the maneuvering device. In such an embodiment, the vehicle control command section 312 may generate a correction value with the vehicle state information SJ taken into consideration, and may generate a travel control signal by reflecting the generated correction value in the travel control signal according to the operation applied to the maneuvering device. Such an embodiment also brings about similar advantageous effects to those of the embodiments.

F15

Transporting a vehicle by utilizing travel of the vehicle by driverless driving is also referred to as "self-propelled transport". A configuration for implementing the self-propelled transport is also referred to as "vehicle remote control self-driving transport system". Moreover, a production method of producing a vehicle by utilizing the self-propelled transport is also referred to as "self-propelled production". In the self-propelled production, for example, in a factory where vehicles are manufactured, at least part of transport of each vehicle is implemented by the self-propelled transport.

The present disclosure is not limited to the embodiments described above, and can be implemented in various configurations without departing from the gist thereof. For example, technical features in the embodiments that correspond to the technical features in the individual embodiments described in SUMMARY can be replaced or combined as appropriate, in order to solve one or some, or all, of the problems, or to achieve one or some, or all, of the advantageous effects. A technical feature can be excluded as appropriate unless the technical feature is described as essential in the present description.

What is claimed is:

1. A control device configured to control movement of a mobile object that is configured to travel by driverless driving and that is transported in a manufacture process of manufacturing the mobile object, the control device comprising a control command section configured to generate and output a control command to cause the mobile object to move, wherein the control command section is configured to generate the control command by using vehicle state information that is information related to at least one of: magnitude of impact force applied to the mobile object; a direction in which the impact force acts; weight of the mobile object; weight of a trailer configured to carry a part and configured to be removably coupled to the mobile object and move, the part being configured to be attached to the mobile object; and a process in which the mobile object is positioned, and wherein occurrence of the impact force stems from at least one of force acting when the part comes into contact with the mobile object, force acting when the part is fixed to the mobile object, and force acting when the trailer is coupled to the mobile object.

2. The control device according to claim 1, wherein the control command section is configured to generate the control command by using the vehicle state information in such a manner as to restrain a change in speed of the mobile object that changes due to at least one of the impact force, attachment of the part to the mobile object, coupling of the trailer to the mobile object, and release of the coupling between the trailer and the mobile object.

3. The control device according to claim 1, wherein the control command section is configured to generate the control command by using the vehicle state information in such a manner as to restrain a change in traveling direction of the mobile object that changes due to at least one of the impact force, attachment of the part to the mobile object, coupling of the trailer to the mobile object, and release of the coupling between the trailer and the mobile object.

4. The control device according to claim 1, further comprising an information acquisition section configured to acquire, as the vehicle state information, impact force information related to the impact force from a sensor configured to detect the impact force, wherein the control command section is configured to generate the control command by using the acquired impact force information.

5. The control device according to claim 1, further comprising an information acquisition section configured to acquire, as the vehicle state information, coupling release information indicating whether or not a coupled state in which the trailer and the mobile object are coupled together is released, from a sensor configured to acquire the coupling release information, wherein the control command section is configured to generate the control command by using the coupling release information.

6. The control device according to claim 1, further comprising an information acquisition section configured to acquire, as the vehicle state information, weight-related information that is information related to the weight of the mobile object, wherein the control command section is configured to use the acquired weight-related information and, when the weight of the mobile object increases, generate the control command in such a manner as to decrease speed of the mobile object, compared to a speed before the weight of the mobile object increases.

7. The control device according to claim 6, wherein the control command section is configured to generate the control command in such a manner as to decrease the speed of the mobile object, compared to the speed before the weight of the mobile object increases, when the mobile object is positioned in a prior-to-bumper-attachment process and when the weight of the mobile object increases compared to the weight of the mobile object in a process prior to the prior-to-bumper-attachment process, and is configured not to generate such a control command as to decrease the speed of the mobile object, compared to the speed before the weight of the mobile object increases, when the mobile object is positioned in a subsequent-to-bumper-attachment process and when the weight of the mobile object increases compared to the weight of the mobile object in a process prior to the subsequent-to-bumper-attachment process, the prior-to-bumper-attachment process being a process prior to a bumper attachment process in which a bumper is attached to the mobile object in the manufacture process, the subsequent-to-bumper-attachment process being a process subsequent to the bumper attachment process.

8. The control device according to claim 6, wherein the control command section is configured to generate the control command in such a manner as to decrease the speed of the mobile object, compared to the speed before the weight of the mobile object increases, when the mobile object is positioned in a manned process in which a worker is present in the manufacture process and when the weight of the mobile object increases compared to the weight of the mobile object in a process prior to the manned process, and is configured not to generate such a control command as to decrease the speed of the mobile object, compared to the speed before the weight of the mobile object increases, when the mobile object is positioned in an unmanned process in which a worker is not present in the manufacture process and when the weight of the mobile object increases compared to the weight of the mobile object in a process prior to the unmanned process.

9. The control device according to claim 6, further comprising a weight estimation section configured to estimate a weight of the mobile object by using the weight-related information, wherein the control command section is configured to use the estimated weight of the mobile object and, when the weight of the mobile object increases, generate the control command in such a manner as to decrease the speed of the mobile object, compared to the speed before the weight of the mobile object increases.

10. The control device according to claim 9, further comprising an information keeping section configured to keep position-weight correspondence information that is information in which a position of the mobile object and a weight of the mobile object are associated with each other, wherein the information acquisition section is configured to acquire a position of the mobile object as the weight-related information, and the weight estimation section is configured to estimate a weight of the mobile object at the position of the mobile object, by using the position-weight correspondence information and the acquired position of the mobile object.

11. The control device according to claim 9, wherein the information acquisition section is configured to acquire, as the weight-related information, displacement information indicating a displacement of a suspension device that supports a wheel included in the mobile object, and the weight estimation section is configured to estimate a weight of the mobile object by using the displacement information.

12. The control device according to claim 1, further comprising a position estimation section configured to estimate a position of the mobile object, wherein the control command section is configured to generate the control command by using a database and the estimated position of the mobile object, the database keeping information related to the control command and position information on the mobile object in association with each other, and the information related to the control command in the database is specified beforehand based on the vehicle state information corresponding to the position of the mobile object.

13. A trailer configured to carry a part configured to be attached to a mobile object configured to travel by driverless driving in a manufacture process of manufacturing the mobile object, the trailer comprising:

a coupling part configured to be coupled to the mobile object;

a trailer drive part configured to cause the trailer to move dependently on movement of the mobile object in a coupled state in which the mobile object and the trailer are coupled together by the coupling part;

a coupling detection section configured to detect whether or not the coupling part is in the coupled state; and a communication device configured to transmit a result of the detection by the coupling detection section to the control device according to claim 1.

14. The trailer according to claim 13, further comprising a drive control section configured to control driving of the trailer drive part, wherein the drive control section is configured to increase braking force of the trailer drive part when it is detected by the coupling detection section that the coupling part changes from the coupled state to a non-coupled state in which the mobile object and the trailer are not coupled together by the coupling part.

15. The trailer according to claim 14, wherein the drive control section is configured to, after increasing the braking force, control the trailer drive part in such a manner as to move the trailer to a process prior to a process in which the trailer is positioned in the manufacture process.

16. The trailer according to claim 13, further comprising:

a process information acquisition section configured to acquire information indicating whether or not the mobile object has completed a coupled-state process predetermined as a process that is executed in the coupled state in the manufacture process; and a coupling control section configured to, when the mobile object has completed the coupled-state process, control the coupling part in such a manner as to bring about a non-coupled state in which the mobile object and the trailer are not coupled together.

17. A mobile object comprising a driving control section configured to acquire a control command to cause the mobile object to move and configured to perform driving control of the mobile object by using the acquired control command, wherein the driving control section is configured to execute correcting the acquired control command by using information related to at least one of magnitude of impact force applied to the mobile object, a direction in which the impact force acts, weight of the mobile object, weight of a trailer configured to carry a part to be attached to the mobile object and configured to be removably coupled to the mobile object and move, and a process in which the mobile object is positioned, and performing the driving control, according to the corrected control command, and wherein occurrence of the impact force stems from at least one of force acting when the part comes into contact with the mobile object, force acting when the part is fixed to the mobile object, and force acting when the trailer is coupled to the mobile object-object.

18. A mobile object control system comprising:

a server device configured to generate and output a control command to cause a mobile object to move, the mobile object being configured to travel by driverless driving; and the mobile object according to claim 17.

19. A control method of controlling movement of a mobile object that is configured to travel by driverless driving and that is transported in a manufacture process of manufacturing the mobile object, the control method comprising generating a control command to cause the mobile object to move, by using vehicle state information that is information related to at least one of magnitude of impact force applied to the mobile object, a direction in which the impact force acts, weight of the mobile object, weight of a trailer configured to carry a part to be attached to the mobile object and configured to be coupled to the mobile object and move, and a process in which the mobile object is positioned, wherein occurrence of the impact force stems from at least one of force acting when the part comes into contact with the mobile object, force acting when the part is fixed to the mobile object, and force acting when the trailer is coupled to the mobile object.

\* \* \* \* \*